(12) United States Patent
Sun et al.

(10) Patent No.: US 12,474,812 B2
(45) Date of Patent: Nov. 18, 2025

(54) SCREEN SPLITTING METHOD AND APPARATUS IN MULTI-APPLICATION SCENARIO, AND ELECTRONIC DEVICE

(71) Applicant: HUAWEI TECHNOLOGIES CO., LTD., Guangdong (CN)

(72) Inventors: Xiaokang Sun, Lund (SE); Zongbo Wang, Nanjing (CN); Xueyan Huang, Shenzhen (CN); Yuqiong Xu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/857,948

(22) Filed: Jul. 5, 2022

(65) Prior Publication Data

US 2022/0334684 A1 Oct. 20, 2022

Related U.S. Application Data

(63) Continuation of application No. PCT/CN2020/113688, filed on Sep. 7, 2020.

(30) Foreign Application Priority Data

Jan. 3, 2020 (CN) .......................... 202010005373.3

(51) Int. Cl.
*G06F 3/0481* (2022.01)
*G06F 3/04845* (2022.01)
(Continued)

(52) U.S. Cl.
CPC ........ *G06F 3/0481* (2013.01); *G06F 3/04845* (2013.01); *G06F 3/0486* (2013.01);
(Continued)

(58) Field of Classification Search
CPC .. G06F 3/0481; G06F 3/04845; G06F 3/0486; G06F 3/0488; G06F 2203/04803;
(Continued)

(56) References Cited

U.S. PATENT DOCUMENTS

2007/0300185 A1* 12/2007 Macbeth ................. G06F 9/451
715/764
2010/0095240 A1* 4/2010 Shiplacoff ........... G06F 3/04883
345/157
(Continued)

FOREIGN PATENT DOCUMENTS

| CN | 103488383 A | 1/2014 |
|---|---|---|
| CN | 104978123 A | 10/2015 |

(Continued)

OTHER PUBLICATIONS

Baidu netizens 04b5aa1, How to set Xiaomi split screen multitasking how to use Xiaomi split screen function, Sep. 9, 2019, with the English Translation, 7 pages.
(Continued)

*Primary Examiner* — Daniel W Parcher

(57) ABSTRACT

This application provides a screen splitting method and apparatus in a multi-application scenario. The method is applied to the electronic device, so that a plurality of applications may be simultaneously displayed on a screen of the electronic device. The method includes: receiving a first instruction; displaying a first interface in response to the first instruction, where the first interface includes preview cards of applications that are recently run and that are not closed; receiving a second instruction for at least one of the preview cards; and displaying a second interface according to the second instruction, where the second interface includes at
(Continued)

least two display areas, and an application corresponding to the at least one preview card is displayed in at least one display area.

20 Claims, 13 Drawing Sheets

(51) Int. Cl.
*G06F 3/0486* (2013.01)
*G06F 3/0488* (2022.01)

(52) U.S. Cl.
CPC .. *G06F 3/0488* (2013.01); *G06F 2203/04803* (2013.01); *G06F 2203/04808* (2013.01)

(58) Field of Classification Search
CPC ......... G06F 2203/04808; G06F 1/1624; G06F 1/1641; G06F 1/1647; G06F 1/1652; G06F 3/0483; G06F 3/04883; G06F 3/04886; G06F 9/451; G06F 3/0484
See application file for complete search history.

(56) References Cited

U.S. PATENT DOCUMENTS

| | | | | |
|---|---|---|---|---|
| 2011/0016417 | A1* | 1/2011 | Shiplacoff | G06F 1/3275 |
| | | | | 715/768 |
| 2012/0081319 | A1* | 4/2012 | Gimpl | G06F 3/04842 |
| | | | | 345/1.3 |
| 2012/0084726 | A1* | 4/2012 | Sirpal | G06F 3/0486 |
| | | | | 715/802 |
| 2013/0080957 | A1* | 3/2013 | Sirpal | G02B 6/0001 |
| | | | | 715/769 |
| 2014/0013271 | A1* | 1/2014 | Moore | G06F 3/04883 |
| | | | | 715/792 |
| 2014/0137020 | A1* | 5/2014 | Sharma | G06F 3/0486 |
| | | | | 715/810 |
| 2014/0337794 | A1* | 11/2014 | Vranjes | G06F 9/451 |
| | | | | 715/800 |
| 2015/0253937 | A1 | 9/2015 | Kim et al. | |
| 2016/0062552 | A1 | 3/2016 | Jeong et al. | |
| 2017/0329500 | A1* | 11/2017 | Grammatikakis | G06F 3/0483 |
| 2018/0121082 | A1* | 5/2018 | Zhu | G06F 3/04847 |
| 2018/0329508 | A1* | 11/2018 | Klein | G06F 3/011 |

FOREIGN PATENT DOCUMENTS

| | | |
|---|---|---|
| CN | 104991704 A | 10/2015 |
| CN | 105353936 A | 2/2016 |
| CN | 105573740 A | 5/2016 |
| CN | 106155484 A | 11/2016 |
| CN | 107193445 A | 9/2017 |
| CN | 107957832 A | 4/2018 |
| CN | 108958633 A | 12/2018 |
| CN | 109358929 A | 2/2019 |
| CN | 109683837 A | 4/2019 |
| CN | 109947508 A | 6/2019 |
| CN | 110058649 A | 7/2019 |
| CN | 110568990 A | 12/2019 |
| IN | 106537319 A | 3/2017 |
| WO | 2018049812 A1 | 3/2018 |

OTHER PUBLICATIONS

Lenovo Mobile Service Official Website, How to use the split screen function on Lenovo L58041?, Oct. 26, 2018, with the English Translation, 48 pages.

OnePlus6, One plus 6 Android Pie first experience, Sep. 8, 2018, with the English Translation, 12 pages.

* cited by examiner a b c d f

SCREEN SPLITTING METHOD AND APPARATUS IN MULTI-APPLICATION SCENARIO, AND ELECTRONIC DEVICE

CROSS-REFERENCE TO RELATED APPLICATIONS

This application is a continuation of International Application No. PCT/CN2020/113688, filed on Sep. 7, 2020, which claims priority to Chinese Patent Application No. 202010005373.3, filed on Jan. 3, 2020. The disclosures of the aforementioned applications are hereby incorporated by reference in their entireties.

TECHNICAL FIELD

Embodiments of the present invention relate to the field of computer technologies, and in particular, to a screen splitting method in a multi-application scenario.

BACKGROUND

Multi-application switching is one of operations frequently used by an end user. The user usually starts a plurality of applications, and then invokes multi-application switching to switch from a current application to another application. In addition, the user usually needs to simultaneously display the plurality of applications on one interface. For example, the user is chatting while watching a movie.

To resolve this problem, the conventional technology provides a screen splitting technology. In the screen splitting technology, two applications may be displayed on a screen, and the two applications are simultaneously run without affecting each other, to prevent a user from frequently performing switching between applications. Existing screen splitting technologies include:

(a) In a system A, on a multi-application switching interface, a preview card of an application is pressed and held, and is dragged to an activation area on either side of a screen to perform horizontal screen splitting, and then another application for which screen splitting is to be performed continues to be selected on the multi-application switching interface. After screen splitting is completed, a display ratio of a split-screen interface may be adjusted by sliding an application division line.

(b) In a system B, a screen splitting operation may be implemented as follows: In a dock bar at a bottom of a screen, an application icon is pressed and held, and is dragged to either side. After screen splitting is completed, a display ratio of a split-screen interface may be adjusted by sliding an application division line.

(c) In a system C, a screen splitting operation may be performed as follows: On a multi-application switching interface, an application icon is pressed and held to expand a menu, and then a screen splitting option is selected. After screen splitting is completed, a display ratio of a split-screen interface may be adjusted by sliding an application division line.

(d) In some customized systems, on a multi-application switching interface, a screen splitting icon is displayed in an upper right corner of a preview interface of an application that supports screen splitting. If the screen splitting icon is tapped, the application that supports screen splitting is displayed on a half screen, and other application icons are displayed on a lower half screen.

If an icon of another application is tapped, the another application is displayed on the lower half screen.

However, the conventional technology has the following disadvantages: For an existing product, on a multi-application switching interface, a relatively complex operation needs to be performed to complete a screen splitting operation. The method performed through menu selection or the method performed by pressing and holding and dragging an application icon to a special activation area is not intuitive, and is difficult for a user to find.

SUMMARY

Embodiments of the present invention provide a screen splitting method and apparatus in a multi-application scenario, and an electronic device, and are applied to the field of computer technologies, to resolve a problem in the conventional technology that a screen splitting operation is relatively complex, not intuitive, and relatively difficult for a user to find.

To achieve the foregoing technical objective, the following technical solutions are used in the embodiments of the present invention:

According to a first aspect, an embodiment of the present invention provides a screen splitting method in a multi-application scenario. The method is applied to an electronic device, so that a plurality of applications may be simultaneously displayed on a screen of the electronic device. The method includes: receiving a first instruction; displaying a first interface in response to the first instruction, where the first interface includes preview cards of applications that are recently run and that are not closed; receiving a second instruction for at least one of the preview cards; and displaying a second interface according to the second instruction, where the second interface includes at least two display areas, and an application corresponding to the at least one preview card is displayed in at least one display area.

In the method, a screen splitting operation for a user is more intuitive and more user-friendly.

It should be noted that in the present invention, the first interface includes preview cards of all applications that are recently run and that are not closed. The preview cards may be arranged horizontally, vertically, or in another manner. This is not limited in the present invention. The preview card is a card generated when an application exits a current application interface. The exiting a current application interface includes returning to a home screen or invoking multi-application switching.

With reference to the first aspect, in a possible implementation, a manner of receiving the second instruction for the at least one of the preview cards; and displaying the second interface according to the second instruction may be: receiving an instruction for dragging a first preview card in the preview cards, and displaying the second interface when a dragging position enters a boundary position of a second preview card in the preview cards.

It should be noted that in this embodiment of the present invention, screen splitting may be supported for at least two applications. In this implementation, the user may continue to press and hold and drag a plurality of preview cards such as a third preview card and a fourth preview card to enter an application split-screen interface. Display of the multi-application split-screen interface needs to be adaptively adjusted based on a quantity of applications for which screen splitting is to be performed.

In this manner, the user may perform screen splitting more intuitively.

With reference to the first aspect, in a possible implementation, a manner of receiving the second instruction for the at least one of the preview cards; and displaying the second interface according to the second instruction may be: receiving an instruction for dragging the at least one of the preview cards to a specified position, and displaying the second interface.

It should be noted that in this embodiment of the present invention, when an instruction for dragging only one preview card to the specified position is received, an application corresponding to the preview card is displayed in one display area on the displayed second interface, and a main interface is displayed in another display area.

With reference to the first aspect, in a possible implementation, a manner of receiving the second instruction for the at least one of the preview cards; and displaying the second interface according to the second instruction may be: receiving an instruction for dragging the at least one of the preview cards to a specified screen splitting icon, and displaying the second interface.

It should be noted that in this embodiment of the present invention, when an instruction for dragging only one preview card to the specified screen splitting icon is received, an application corresponding to the preview card is displayed in one display area on the displayed second interface, and a main interface is displayed in another display area.

In the foregoing two methods, a screen splitting operation for the user is more intuitive and more user-friendly.

With reference to the first aspect, in a possible implementation, a manner of receiving the second instruction for the at least one of the preview cards; and displaying the second interface according to the second instruction may be: receiving an instruction for selecting the at least one of the preview cards, receiving an instruction for tapping a screen splitting button or a screen splitting icon, and displaying the second interface.

It should be noted that in this embodiment of the present invention, after an instruction for selecting only one preview card is received, when the instruction for tapping the screen splitting button or the screen splitting icon is received, an application corresponding to the preview card is displayed in one display area on the displayed second interface, and a main interface is displayed in another display area.

In this embodiment, screen splitting may be implemented for a plurality of applications, and a plurality of split-screen cards can coexist on the second interface, which is more flexible. In this embodiment, an operation manner of selecting an application and then triggering screen splitting is provided, and a quantity of parts into which the screen needs to be divided may be determined based on a quantity of applications selected by the user. Different from manners in Embodiment 1 and Embodiment 2, this manner is implemented as follows: One application is first dragged, and the multi-application split-screen interface is displayed on two split screens, then another application is dragged, and the multi-application split-screen interface is displayed on three split screens, and so on. The operation in this embodiment is more user-friendly and concise.

With reference to the first aspect, in a possible implementation, a manner of receiving the second instruction for the at least one of the preview cards; and displaying the second interface according to the second instruction may be: receiving an instruction for sliding the at least one preview card, and displaying the second interface.

In this implementation, a distance, duration, or strength of the sliding action is directly proportional to a size of the at least one of the at least two display areas.

It should be noted that in this embodiment of the present invention, when an instruction for sliding only one preview card is received, an application corresponding to the preview card is displayed in one display area on the displayed second interface, and a main interface is displayed in another display area.

With reference to the first aspect, in a possible implementation, a manner of receiving the second instruction for the at least one of the preview cards; and displaying the second interface according to the second instruction may be: receiving an instruction for simultaneously and respectively sliding two of the preview cards with two fingers, and displaying the second interface.

It should be noted that in this embodiment of the present invention, screen splitting may be supported for at least two applications. In this case, in this embodiment of the present invention, an instruction for simultaneously and respectively sliding a plurality of preview cards with a plurality of fingers may be received, and the second interface may be displayed. In this implementation, a distance, duration, or strength of the sliding action is directly proportional to a size of the at least one of the at least two display areas.

In this manner, the display areas on the second interface can differ in size, in other words, the display areas on the second interface are not display areas of a same size.

With reference to the first aspect, in a possible implementation, after the second interface is displayed, a horizontal or vertical position of the application corresponding to the at least one preview card displayed in the at least one display area on the second interface may be adjusted by dragging the application. The application may be directly dragged, or may be dragged after a movement attribute of the application corresponding to the preview card is activated. A movement attribute of a card may be activated by pressing and holding the card, or may be activated in another manner. This is not limited in the present invention.

The second interface displayed after screen splitting is a split-screen interface that includes a plurality of applications. It may be understood that after screen splitting, a multi-application split-screen card (as shown in FIG. 19(4)) is displayed on the screen, and whether the user needs to tap the card to display a multi-application split-screen interface (as shown in FIG. 19 (5)) or whether to directly display a multi-application split-screen interface (as shown in FIG. 19(5)) is determined by an implementation of the electronic device. This is not limited in the present invention.

With reference to the first aspect, in a possible implementation, the method provided in this embodiment of the present invention may be applied to an electronic device with a foldable screen.

It should be noted that the electronic device with the foldable screen may be folded to divide the foldable screen into a plurality of display areas, and each display area is referred to as one screen. For example, the electronic device may be folded along a folding edge or a folding axis to form a first screen and a second screen. In actual application, electronic devices with foldable screens may be classified into two types: an electronic device whose foldable screen is to be folded outwards and an electronic device whose foldable screen is to be folded inwards. An example in which the electronic device is folded to form the first screen and the second screen is used. After the electronic device to be folded outwards is folded, the first screen and the second screen are opposite to each other. After the electronic device to be folded inwards is folded, the first screen and the second screen face each other.

It may be understood that when the electronic device is in a folded state, an interface may be displayed on the first screen or the second screen. When the electronic device is in an expanded state, the interface may be displayed on the first screen and the second screen. For description of the expanded state and the folded state of the electronic device, refer to the following description.

Generally, for the electronic device with the foldable screen (including the electronic device to be folded outwards and the electronic device to be folded inwards), a value range of an angle $\alpha$ between the first screen and the second screen is usually [0°, 180°]. In this embodiment of the present invention, if $\alpha$ falls within [0°, P], it may be determined that the electronic device is in the folded state; and if $\alpha$ falls within (P, 180°], it may be determined that the electronic device is in the expanded state. Alternatively, if $\alpha$ falls within [0°, P), it may be determined that the electronic device is in the folded state; and if $\alpha$ falls within [P, 180°], it may be determined that the electronic device is in the expanded state. Herein, P represents a preset angle threshold, and P may be determined based on use habits of using the foldable screen by a large quantity of users, or P may be set by the user in the electronic device.

In this implementation, in the foldable screen scenario, a manner of receiving the second instruction for the at least one of the preview cards; and displaying the second interface according to the second instruction is the same as the foregoing manner. In a possible implementation, in the foldable screen scenario, the displaying a second interface includes:

(a) when the foldable screen is in the folded state, displaying the second interface in a same manner as that of displaying the second interface on a mobile phone with a non-foldable screen, that is, displaying the second interface on the first screen or the second screen;

(b) when the foldable screen is in the expanded state, respectively displaying display content in the at least two display areas on the second interface on the first screen and the second screen of the foldable screen, where different content is displayed on the first screen and the second screen; or (c) in an expansion process of the foldable screen, namely, a process in which the foldable screen changes from the folded state to the expanded state, displaying the second interface from one screen to two screens; or in a folding process of the foldable screen, displaying the second interface from two screens to one screen.

It should be noted that in this application, the method in this embodiment of this application is described by using an example in which the mobile phone is in the folded state when the angle $\alpha$ between the first screen and the second screen is equal to 0°, and the mobile phone is in the expanded state when the angle $\alpha$ between the first screen and the second screen is equal to 180°. When the angle of the mobile phone falls within (0°, 180°), it indicates that the mobile phone is in the expansion process or the folding process. A process in which the angle between the first screen and the second screen of the mobile phone gradually increases from 0° to 180° is referred to as the expansion process of the mobile phone, and a process in which the angle between the first screen and the second screen of the mobile phone gradually decreases from 180° to 0° is referred to as the folding process of the mobile phone.

With reference to the first aspect, in a possible implementation, this embodiment of the present invention further includes: displaying a third interface if the first instruction is received again after the second interface is displayed, where the third interface includes at least one split-screen card, the split-screen card includes at least two display areas, and the application corresponding to the at least one preview card is displayed in at least one display area.

With reference to the first aspect, in a possible implementation, this embodiment of the present invention further includes: replacing or releasing the application corresponding to the at least one preview card displayed in the at least one display area on the second interface. In a possible implementation, the replacing the application corresponding to the at least one preview card displayed in the at least one display area on the second interface includes: receiving an instruction for dragging a third preview card, where the third preview card is not the split-screen card, and when the third preview card is dragged to a display area of the split-screen card, replacing an application displayed in the display area. Two-screen splitting is used as an example. In this case, the replaced application in the display area is restored and displayed in an independent preview card. In the case of N-screen splitting, where N-screen splitting means that screen splitting is performed for N applications to simultaneously display the N applications on the screen, the replacing the application corresponding to the at least one preview card displayed in the at least one display area on the second interface includes: receiving an instruction for dragging an $(N+1)^{th}$ preview card, where the $(N+1)^{th}$ preview card is not the split-screen card, replacing, based on a display area, of the split-screen card, in which the $(N+1)^{th}$ preview card dwells, an application displayed in the display area, and restoring the replaced application displayed in the display area and displaying the replaced application in an independent preview card.

The releasing the application corresponding to the at least one preview card displayed in the at least one display area on the second interface includes: receiving an instruction for dragging an application displayed in any display area of the split-screen card, and when the application is dragged to a public area, restoring the application and displaying the application in an independent preview card. The public area is an area in which there is no preview card or split-screen card. The dragged application displayed in the display area is restored and displayed in an independent preview card after being released. If N applications are displayed in the display area on the second interface, the second interface includes (N−1) applications after the application is released. If two applications are displayed in the display area on the second interface, the other application is also restored and displayed in an independent preview card.

With reference to the first aspect, in a possible implementation, the method in this embodiment of the present invention further includes: recording a historical application split-screen arrangement position, and collecting, based on the historical application split-screen arrangement position, statistics on a behavior rule of performing screen splitting by a user; and the displaying a second interface includes: laying out an arrangement position of an application on the second interface based on the behavior rule of performing screen splitting by the user. For example, a machine learning model may be trained based on historical application split-screen arrangement positions recorded in a past period of time. The model is used to collect the statistics on the behavior rule of performing screen splitting by the user, and then the arrangement position of the application on the second interface is laid out by using the machine learning model. It should be noted that a manner of collecting the statistics on the behavior rule of performing screen splitting by the user is not limited in this embodiment of the present invention.

In this embodiment, different statuses of the foldable screen may be identified, and a plurality of applications are displayed on the foldable screen after screen splitting is performed. In this embodiment, a screen splitting habit of the user for a specific application may be recorded, and the specific application is displayed at a position determined based on the habit of the user, thereby achieving better user experience.

According to a second aspect, for each method provided in the present invention, an embodiment of the present invention further provides a screen splitting apparatus in a multi-application scenario. The apparatus includes a module configured to implement the steps of the method. The module may be implemented by software or a combination of software and hardware.

According to a third aspect, an embodiment of the present invention provides an electronic device. The electronic device includes a processor and a memory. The memory is configured to: store a computer program and run data. The computer program includes instructions, and when the instructions are executed by the processor, the electronic device is enabled to perform the method according to any one of the first aspect and the possible implementations of the first aspect.

According to a fourth aspect, an embodiment of the present invention provides a computer storage medium that includes a computer program. When the computer program is run on an electronic device, the electronic device is enabled to perform the method according to any one of the first aspect and the possible implementations of the first aspect.

According to a fifth aspect, an embodiment of the present invention provides a computer program (product) that includes instructions. When the instructions are run on a computer, the computer is enabled to perform the method according to any one of the first aspect and the possible implementations of the first aspect.

According to a sixth aspect, an embodiment of the present invention provides a graphical user interface on an electronic device. The electronic device includes a foldable display screen, a memory, and a processor. The processor is configured to execute a computer program stored in the memory, and the graphical user interface includes a graphical user interface displayed when the electronic device performs the method according to any one of the first aspect and the possible implementations of the first aspect.

BRIEF DESCRIPTION OF DRAWINGS

To describe technical solutions in embodiments of the present invention or in the conventional technology more clearly, the following briefly describes accompanying drawings used in describing the embodiments or the conventional technology. Definitely, the accompanying drawings in the following description show merely some embodiments of the present invention, and a person of ordinary skill in the art may derive other accompanying drawings from these accompanying drawings without creative efforts.

DESCRIPTION OF EMBODIMENTS

The following clearly describes technical solutions in embodiments of the present invention with reference to accompanying drawings in the embodiments of the present invention.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the present invention, unless otherwise stated, "a plurality of" means two or more than two. The term "and/or" in this application describes only an association relationship for describing associated objects and represents that three relationships may exist. For example, A and/or B may represent the following three cases: Only A exists, both A and B exist, and only B exists.

Figure 1:
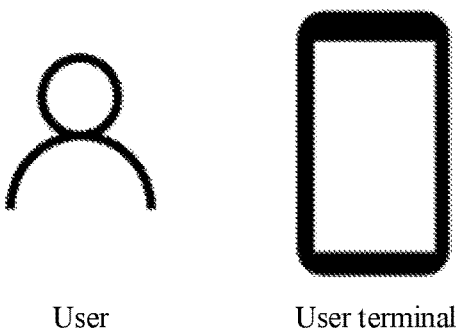
FIG. 1 is a schematic diagram of a system architecture according to an embodiment of the present invention.

FIG. 1 is a schematic diagram of a system architecture according to an embodiment of the present invention. For example, an electronic device in this embodiment of the present invention may be a mobile phone, a tablet computer, a notebook computer, a smartwatch, a television, or another electronic device with a display screen. A specific form of the electronic device is not specifically limited in this embodiment of the present invention. The electronic device usually supports a plurality of applications such as a text processing application, a telephony application, an email application, an instant messaging application, a photo management application, a web browsing application, a digital music player application, and/or a digital video player application. A user may start a plurality of applications during use. The user may need to simultaneously display the plurality of applications on one interface during use. For example, the user is chatting while watching a movie.

Figure 2:
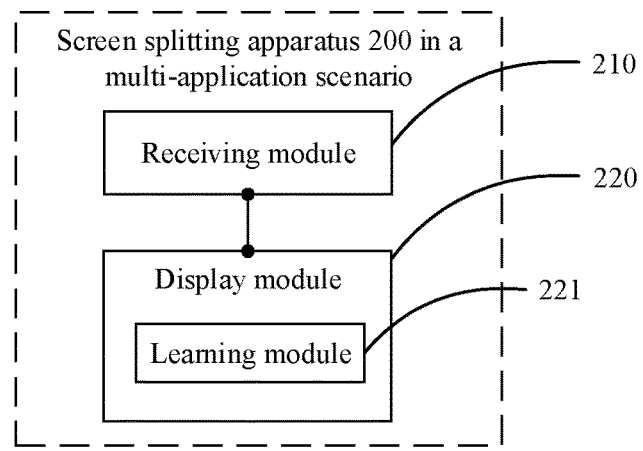
FIG. 2 is a schematic diagram of a screen splitting apparatus in a multi-application scenario according to an embodiment of the present invention.

FIG. 2 is a schematic diagram of a screen splitting apparatus 200 in a multi-application scenario according to an embodiment of the present invention. The apparatus 200 includes a receiving module 210 and a display module 220.

The receiving module 210 is configured to receive a first instruction. Specifically, the first instruction may be an instruction for invoking multi-application switching. The receiving module 210 is further configured to receive a second instruction for at least one of preview cards. Specifically, an input mode of the instruction received by the receiving module 210 may include a touch, a gesture, or the like. For example, the receiving module 210 may receive an operation instruction from a user by using a screen of an electronic device, for example, an instruction for dragging the preview card.

The display module 220 is configured to display a first interface in response to the first instruction. The first interface includes preview cards of applications that are recently run and that are not closed. The display module 220 is further configured to display a second interface according to the second instruction. The second interface includes at least two display areas, and an application corresponding to the at least one preview card is displayed in at least one display area. Specifically, in this embodiment of the present invention, after the operation instruction for invoking multi-application switching is received, the display module 220 displays the preview cards of the applications that are recently run and that are not closed. The first interface, the second interface, or information for interacting with the user, including content that may be viewed by the user (for example, text, an image, a video, an icon, or a symbol), may be displayed by using, for example, a liquid crystal display (LCD), a light-emitting diode (LED) display, an organic light-emitting diode (OLED) display, a micro-electro-mechanical system (MEMS) display, or an electronic paper display.

The display module 220 may further include a learning module 221. The learning module 221 is configured to: record a historical application split-screen arrangement position, and collect, based on the historical application split-screen arrangement position, statistics on a behavior rule of performing screen splitting by the user. A screen splitting habit of the user may be learned by collecting the statistics on the behavior rule of performing screen splitting by the user. During screen splitting, an arrangement position of an application on the second interface is laid out based on the statistics that are on the behavior rule of performing screen splitting by the user and that are collected by the learning module.

A screen splitting method in a multi-application scenario is described in detail below.

Figure 3:
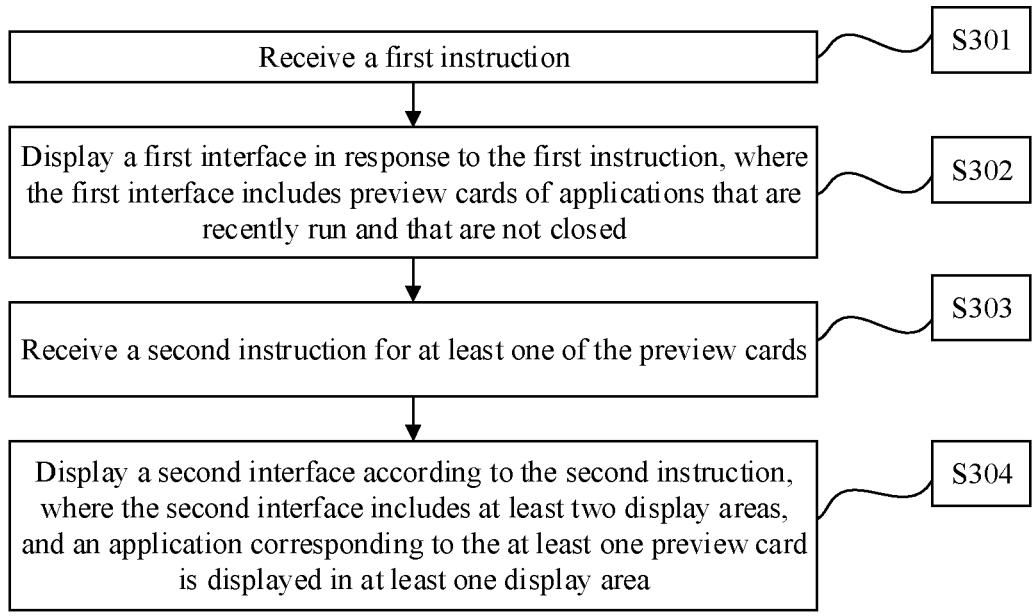
FIG. 3 is a schematic flowchart of a screen splitting method in a multi-application scenario according to an embodiment of the present invention.

FIG. 3 is a schematic flowchart of a screen splitting method in a multi-application scenario according to an embodiment of the present invention. The method includes steps S301 to S304.

Step S301: Receive a first instruction.

A mobile phone is used as an example of an electronic device. A plurality of applications may be installed in the mobile phone, and application icons of these applications are displayed on a home screen (home screen) of the mobile phone. An application icon of an application is a startup entrance of the application, and the application icon may also be referred to as an entry element of the application, or the like. The application in this embodiment of the present invention may be an embedded application (namely, a mobile phone system application) or a downloadable application. The home screen of the mobile phone includes a navigation bar (Navigation Bar). The navigation bar is a shortcut button bar at a bottom of the screen of the mobile phone, and usually appears at the bottom of the screen of the mobile phone in a form of a virtual button. The navigation bar includes three buttons by default. The navigation bar includes a back button, a home button, and a recent (Recent) button. The back button is used to return to a previous interface, the home button is used to return to a desktop, and the recent button is used to display a recently used application. Alternatively, the home screen may not include the navigation bar. Functions of the buttons in the navigation bar may be implemented through gesture control Specifically, in a daily use scenario, a user usually starts a plurality of applications, and the user may invoke multi-application switching by using the recent button or a gesture. The multi-application means applications that are recently run by the user and that are not closed.

Step S302: Display a first interface in response to the first instruction.

The first interface includes preview cards of all applications that are recently run and that are not closed. An example in which the preview cards are horizontally or vertically arranged is used below.

Figure 4:
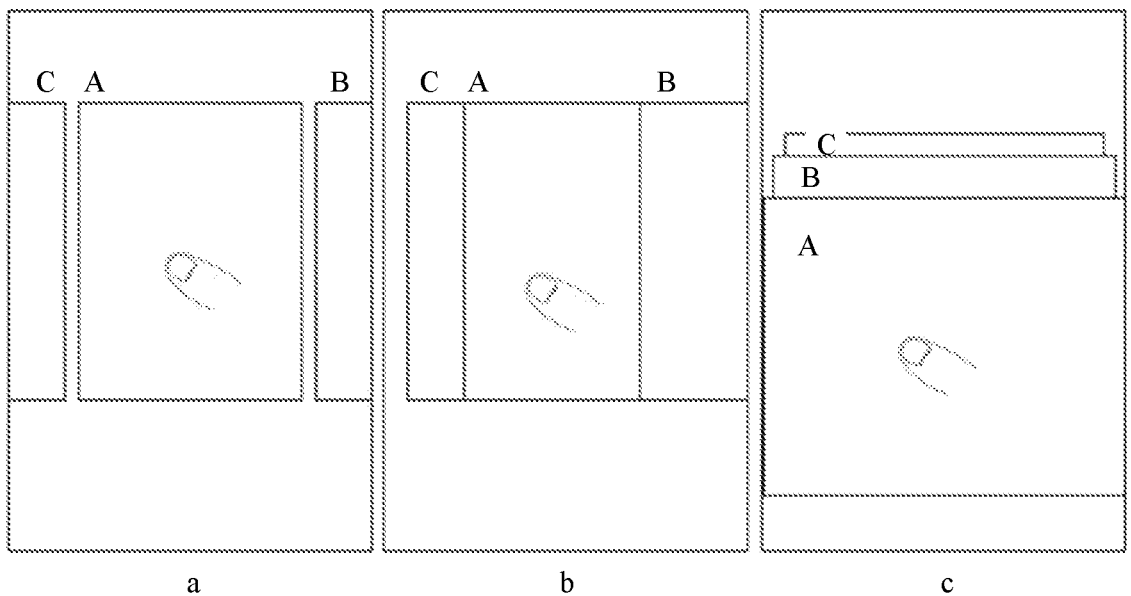
FIG. 4 is a schematic diagram of a manner of arranging preview cards of a plurality of applications according to an embodiment of the present invention.

In a possible implementation, the user invokes, by using the recent button, the applications that are recently run and that are not closed. For example, the applications that are recently run and that are not closed on the mobile phone include a settings application A, a WeChat® application B, and a QQ application C. In this case, display on the screen of the electronic device of the user is shown in FIG. 4. FIG. 4(a) or FIG. 4(b) is a schematic diagram in which preview cards are horizontally arranged, and FIG. 4(c) is a schematic diagram in which preview cards are vertically arranged.

Step S303: Receive a second instruction for at least one of the preview cards.

A manner of receiving the second instruction for the at least one of the preview cards includes the following manner (a), (b), (c), (d), (e), or (f):

(a) An instruction for dragging a first preview card in the preview cards is received.

For a specific operation of the manner a, refer to Embodiment 1.

(b) An instruction for dragging the at least one of the preview cards to a specified position is received.

(c) An instruction for dragging the at least one of the preview cards to a specified screen splitting icon is received.

For a specific operation of the manner b/c, refer to Embodiment 2.

(d) An instruction for selecting the at least one of the preview cards is received, and an instruction for tapping a screen splitting button or a screen splitting icon is received.

For a specific operation of the manner (d), refer to Embodiment 3.

(e) An instruction for sliding the at least one preview card is received. A direction of the sliding action may be sliding downward, sliding upward, sliding leftward, or sliding rightward. This is not limited in the present invention. In an implementation process, a factor that there should be no conflict with an action of closing an application needs to be considered.

(f) An instruction for simultaneously and respectively sliding two of the preview cards with two fingers is received. In this manner, a plurality of fingers may simultaneously and respectively slide a plurality of preview cards to trigger screen splitting. For example, an index finger slides a first preview card, a middle finger slides a second preview card, a ring finger slides a third preview card, and so on. This is not limited in the present invention.

For a specific operation of the manner (e) or (f), refer to Embodiment 4.

Step S304: Display a second interface according to the second instruction, where the second interface includes at least two display areas, and an application corresponding to the at least one preview card is displayed in at least one display area.

Optionally, after the second interface is displayed, a horizontal or vertical position of the application corresponding to the at least one preview card displayed in the at least one display area on the second interface may be adjusted by dragging the application.

The display areas on the second interface may be vertically or horizontally arranged. This is not limited in this embodiment of the present invention. After the second interface is displayed, a position, on the second interface, of the application corresponding to the at least one preview card displayed in the at least one display area on the second interface may be moved by dragging the application corresponding to the preview card. A screen splitting effect may be previewed before the application corresponding to the preview card is released.

The screen splitting method in the multi-application scenario according to the present invention is described below by using specific embodiments. A mobile phone is used as an example of the electronic device. In Embodiments 1 to an Embodiments 4, screen splitting is performed in a non-foldable screen scenario. In Embodiments 5, screen splitting is performed for a plurality of applications in a foldable screen scenario.

Embodiment 1: In a multi-application scenario, an instruction for dragging a first preview card in preview cards is received, and a second interface is displayed when a dragging position enters a boundary position of a second preview card in the preview cards.

In this embodiment of the present invention, an instruction for pressing and holding the preview card is received to activate a movement attribute, and when the dragging touch point position enters the boundary position of the second preview card in the preview cards and a dwell time is greater than preset duration, the second interface is displayed. The preset duration is defined by an electronic device.

Steps 1 and 2: Receive a first instruction, where an instruction for invoking multi-application switching is used as an example; and display a first interface in response to the first instruction, where the first interface include preview cards of all applications that are recently run and that are not closed.

For example, a user starts five applications A, B, C, D, and E on the mobile phone, and temporarily does not close the applications, and the user invokes multi-application switching in a manner of using a recent button, a gesture, or the like. After the user invokes multi-application switching, preview cards of the five applications are displayed on a screen of the mobile phone. It should be noted that preview cards of a plurality of applications may be arranged horizontally, vertically, or in another manner. This is not limited in the present invention. It may be understood that letters A, B, C, and the like on the preview cards are only identifiers, and do not represent content actually displayed on the interface. A finger on the preview card is also merely an example.

FIG. 4 is a schematic diagram of a manner of arranging preview cards of a plurality of applications. It may be understood that several possible manners of arranging the preview cards of the plurality of applications are merely listed in FIG. 4(a), FIG. 4(b), and FIG. 4(c), and are not intended to limit the present invention.

In a part a in FIG. 4, a display manner is horizontal arrangement. The recently operated application A is arranged in the middle, and the applications B and C that are run in the background are evenly distributed on both sides of A.

In a part b in FIG. 4, a display manner is also horizontal arrangement, which is the same as the display manner in the part a in FIG. 4. However, sizes of display windows of the cards are not equal.

In a part c in FIG. 4, a display manner is vertical arrangement.

Steps 3 and 4: Receive a second instruction for at least one of the preview cards, and display the second interface according to the second instruction, where the second interface includes at least two display areas, and an application corresponding to the at least one preview card is displayed in at least one display area.

Figure 5:
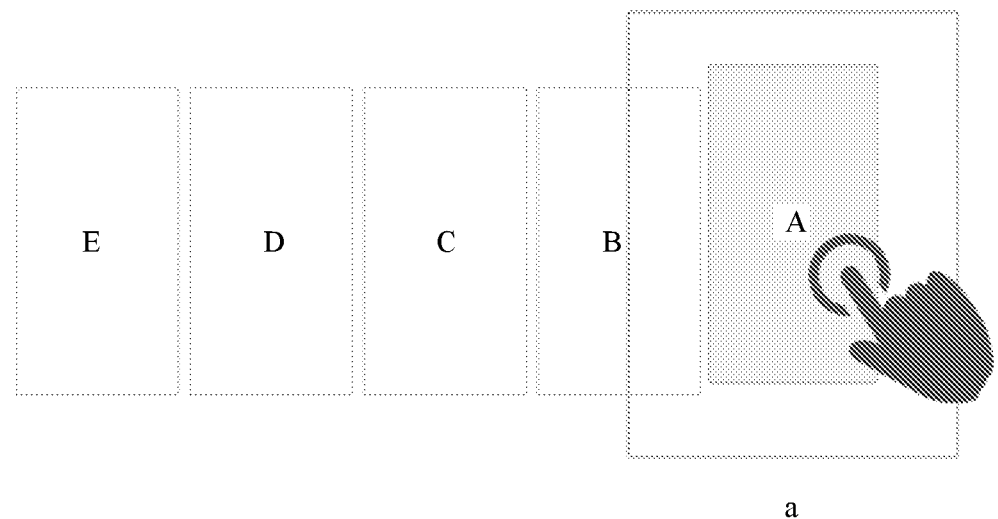
FIG. 5 is a schematic diagram of pressing and holding a preview card A to activate a movement attribute of the preview card A according to an embodiment of the present invention.

An instruction for pressing and holding and dragging the preview card is used as an example. FIG. 5 is a schematic diagram of pressing and holding a preview card A to activate a movement attribute of the preview card A. Preview cards are horizontally arranged. A current visual interface is a gray box A on the rightmost side in FIG. 5, and a part on a left side of B and preview interfaces of C, D, and E are merely examples.

The preview card of the application A is pressed and held to activate the movement attribute of the card. In this case, a position of the preview card of the application A may be freely moved, as shown on a right side of FIG. 5.

Figure 6:
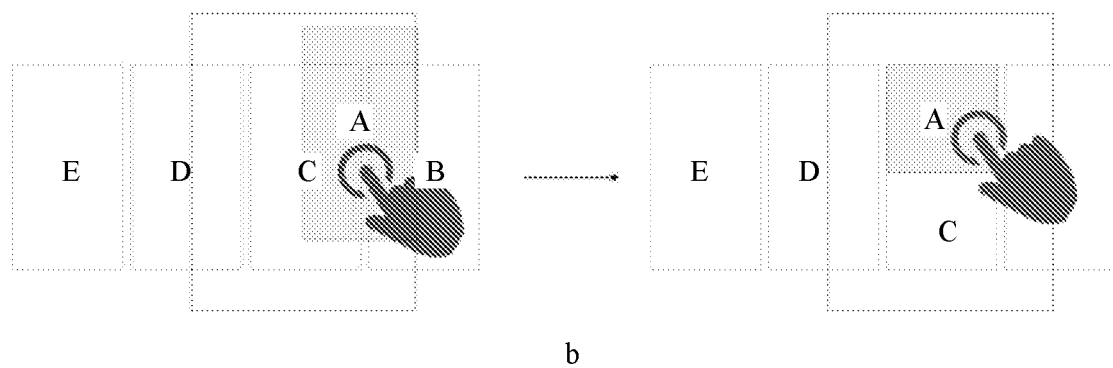
FIG. 6 is a schematic diagram in which preview cards are horizontally arranged and horizontal screen splitting is performed for an application according to an embodiment of the present invention.

FIG. 6 is a schematic diagram in which preview cards are horizontally arranged and horizontal screen splitting is performed for an application.

It is assumed that the user plans to perform screen splitting for the application A and the application C. When an instruction for pressing and holding and dragging the preview card of the application A to a preview card of the application C is received, if a dwell time exceeds the preset duration, for example, 1 second, an animation indicating that the two cards are merging appears, and content to be displayed on upper and lower split screens is determined based on a relative position at which the preview card of the application A is dragged to the preview card of the application C.

If the preview card of the application A is in an upper half part of the preview card of the application C, the application A appears in an upper part on the second interface, as shown on a right side of FIG. 6. On the contrary, the application A appears in a lower part.

It may be understood that different screen splitting manners such as horizontal screen splitting, vertical screen splitting, or another screen splitting manner may be set for different electronic devices. This is not limited in this embodiment of the present invention.

Figure 7:
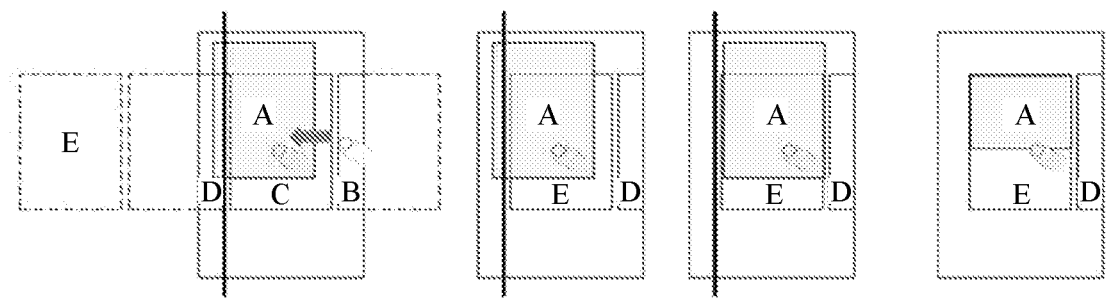
FIG. 7 is a schematic diagram of dragging a preview card of an application A to a preview card E that is not displayed on a screen to perform screen splitting according to an embodiment of this application.

Further, the user may expect to implement split-screen display for the application A and the application E, but currently the application E is not displayed on the screen. Therefore, the user cannot directly drag the preview card of the application A to a boundary of a preview card of the application E. In this case, a boundary line between the application C and the application D may be used, the preview card of the application A is dragged across the boundary line, that is, the preview card of the application A is moved from a status in a left figure in FIG. 6 to a status in a first figure on a left side of FIG. 7, and preview cards of applications are displayed in turn, that is, C is moved rightward. D is moved to a position of C, E is moved to a position of D, and so on. When E appears at a position shown in a second figure on the left side of FIG. 7, the preview card of the application A is dragged to a position of the preview card of the application E, as shown in a second figure on a right side of FIG. 7. After the card A is released, the applications A and E are presented in a split-screen card, as shown in a first figure on the right side of FIG. 7.

Figure 8:
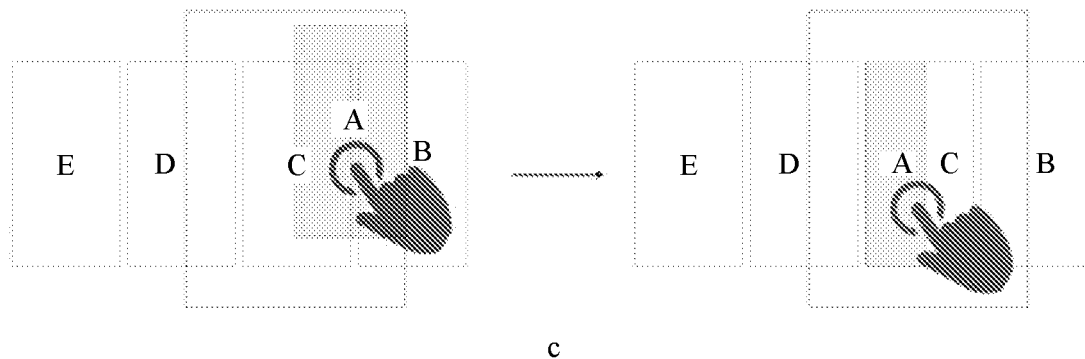
FIG. 8 is a schematic diagram in which preview cards are horizontally arranged and vertical screen splitting is performed for an application according to an embodiment of this application.

FIG. 8 is a schematic diagram in which preview cards are horizontally arranged and vertical screen splitting is performed for an application.

For an electronic device that uses vertical screen splitting by default, for example, a tablet computer, a screen splitting principle is the same as that of horizontal screen splitting. A position at which the application A appears after screen splitting may be determined by dragging the preview card of the application A to a left or right part of the preview card of the application C. As shown in FIG. 8, the preview card of the application A is dragged to a left half part of the preview card of the application C. In this case, after screen splitting, the application A appears on the left, and the application C appears on the right.

Figure 9:
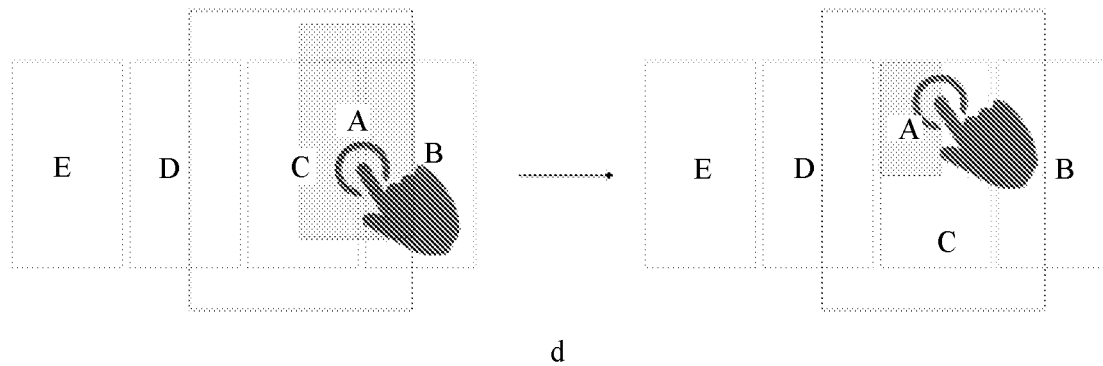
FIG. 9 is a schematic diagram of four-screen splitting according to an embodiment of this application.

The same principle may also be extended to a case of four-screen splitting, as shown in FIG. 9. After one screen splitting operation is completed, screen splitting for an application may further continue to be performed in the other three grids. The method is the same as that described above.

Figure 11:
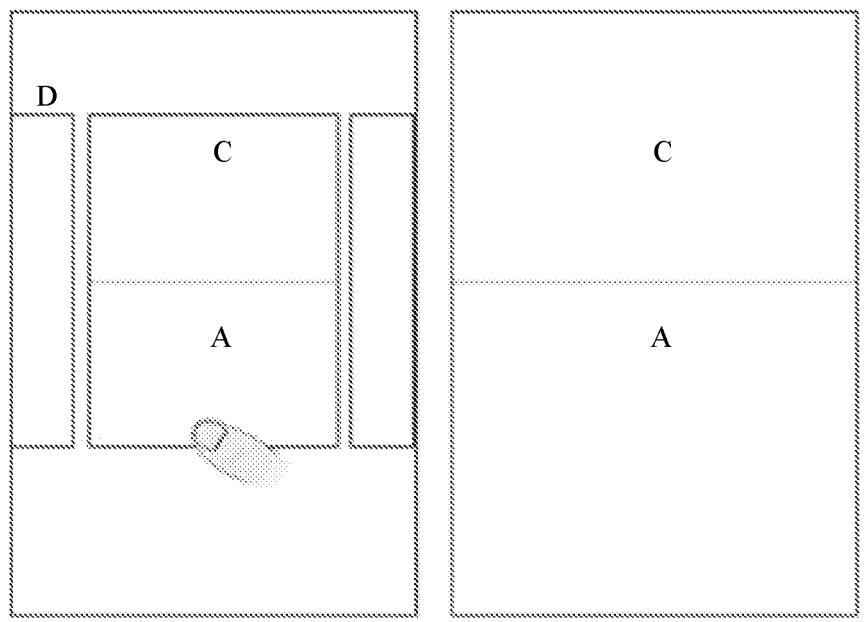
FIG. 11 is a schematic diagram of displaying an application split-screen interface after a screen splitting operation is completed according to an embodiment of this application.

After the screen splitting operation is completed, the second interface includes the at least two display areas, and the application corresponding to the at least one preview card is displayed in the at least one display area. A left figure in FIG. 11 shows an example of two display areas. In this case, the card is tapped to enter an application split-screen interface, as shown in a right figure in FIG. 11.

It may be understood that a plurality of multi-application split-screen cards may coexist on the second interface by repeating the foregoing steps, and different multi-application split-screen cards may be tapped to enter different application split-screen interfaces. As shown in a left figure in FIG. 12, by performing the foregoing steps twice, there is a split-screen card of A and C and a split-screen card of B and D on a current multi-application interface.

Figure 12:
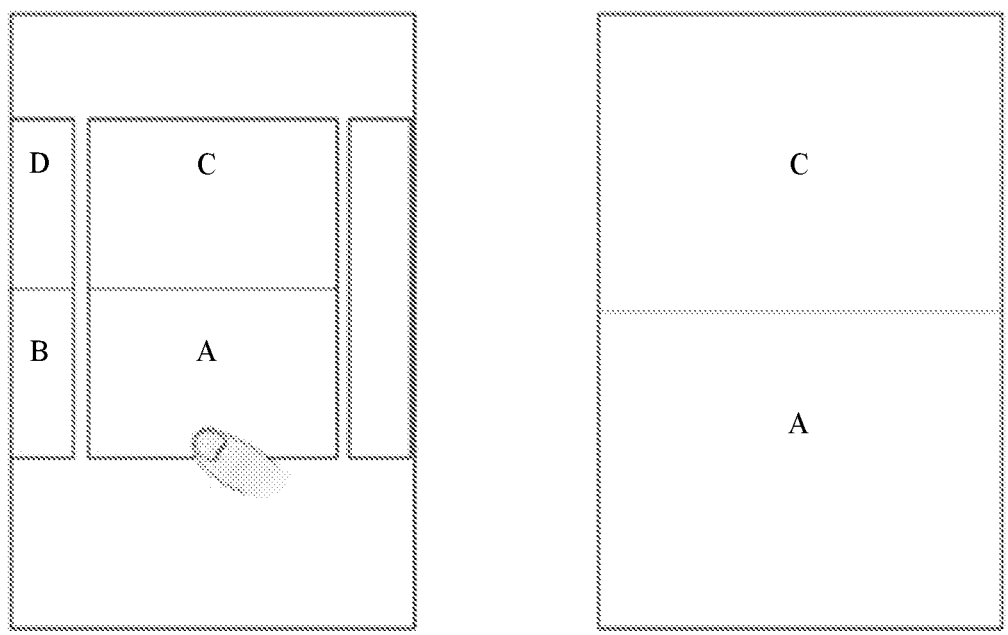
FIG. 12 is a schematic diagram in which there are a plurality of multi-application split-screen cards on a multi-application interface according to an embodiment of this application.

If an instruction for selecting the split-screen card of A and C is received, a split-screen interface of the applications A and C is displayed, as shown in FIG. 12.

Figure 13:
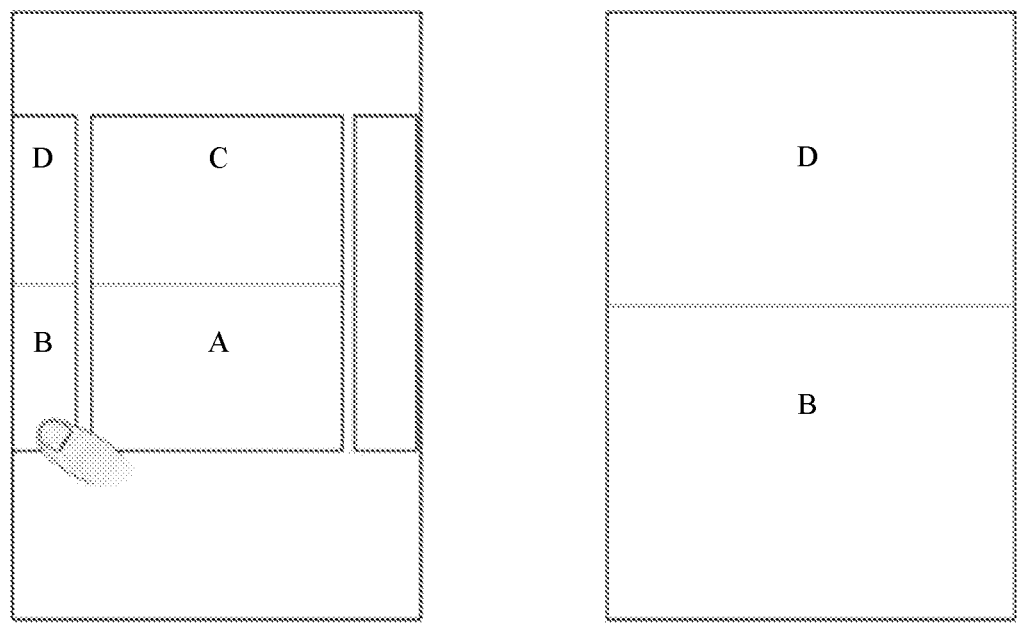
FIG. 13 is a schematic diagram of tapping a multi-application split-screen card to display a multi-application split-screen interface according to an embodiment of this application.

If an instruction for selecting the split-screen card of D and B is received, a split-screen interface of the applications D and B is displayed, as shown in FIG. 13.

Optionally, a system may record a historical application split-screen arrangement position, collect, based on the historical application split-screen arrangement position, statistics on a behavior rule of performing screen splitting by the user, and lay out an arrangement position of an application on the second interface based on the behavior rule of performing screen splitting by the user. For example, a learning module may be displayed in a display module, and is configured to collect the statistics on the behavior rule of the user. The behavior rule includes a position, on the second interface, at which each of the application A and the application B is placed by the user when screen splitting is currently performed for the application A and the application B. A habit of the user is learned by collecting the statistics on the behavior rule of performing screen splitting by the user, for example, collecting statistics on frequency of an arrangement position, and subsequently an application is arranged at a corresponding position based on the habit of the user during screen splitting. For example, during screen splitting, the application A is usually located in an upper half part of the second interface. In this case, after the second instruction is received, when the second interface is displayed, the application A appears in an upper half part of the screen by default in this embodiment of the present invention.

Figure 10:
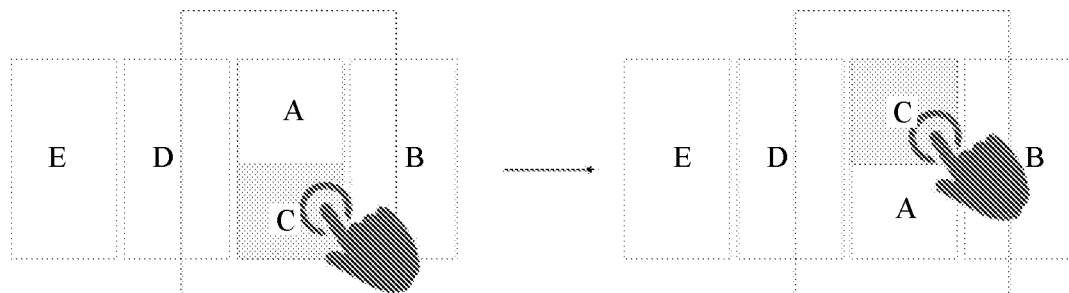
FIG. 10 is a schematic diagram of adjusting a horizontal position of an application in a split-screen card according to an embodiment of this application.

Optionally, after the second interface is displayed, a horizontal or vertical position of the application corresponding to the at least one preview card displayed in the at least one display area on the second interface may be adjusted by dragging the application. FIG. 10 is a schematic diagram of adjusting a horizontal position of an application in a split-screen card. In the split-screen card, a movement operation may be activated again by pressing and holding any application in the split-screen card. By moving a corresponding application, a position of the application relative to another application in the split-screen card may be changed, and a display position of the application in the application split-screen card may be adjusted. As shown in FIG. 10, horizontal positions of the applications A and C on the screen may be adjusted by pressing and holding the preview card of the application C.

Optionally, after the second interface is displayed, the application corresponding to the at least one preview card displayed in the at least one display area on the second interface may be further replaced or released.

On the second interface, two-screen splitting is used as an example. After screen splitting is completed for the applications A and C, when a preview card of the application B continues to be dragged to the split-screen card of the applications A and C, the application A or C in the split-screen card of the applications A and C may be replaced based on a position at which the preview card of the application B dwells, and a split-screen card of the applications A and B or a split-screen card of the applications B and C is generated. In this case, the application card A or the application card C replaced with the application B becomes an independent application card again.

Figure 14:
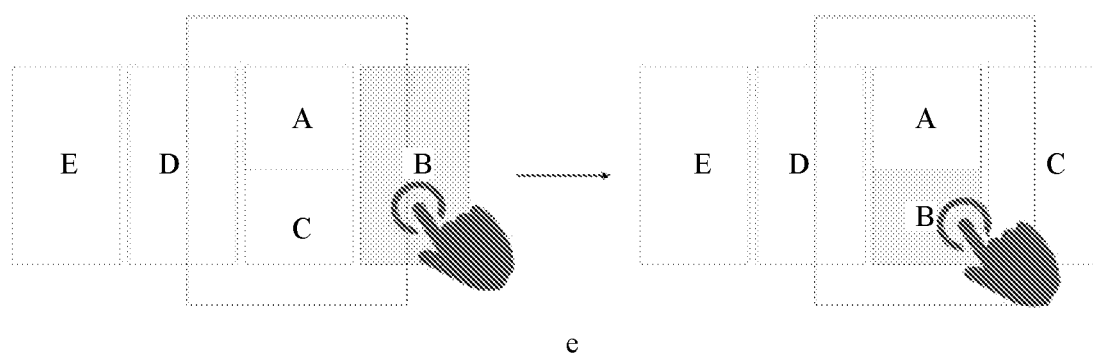
FIG. 14 is a schematic diagram of replacing an application for which screen splitting is performed according to an embodiment of this application.

For example, the application B is to replace the application C. As shown in FIG. 14, after screen splitting is completed for the application A and the application C, the preview card of the application B continues to be dragged to the split-screen card of the applications A and C. As shown in a left figure in FIG. 14, the preview card of the application B dwells at the position of the preview card of the application C. Therefore, the application B replaces the application C in the split-screen card of the applications A and C, and the split-screen card of the applications A and B is generated. The application C replaced with the application B becomes an independent application card again, as shown in a right figure in FIG. 14.

Figure 15:
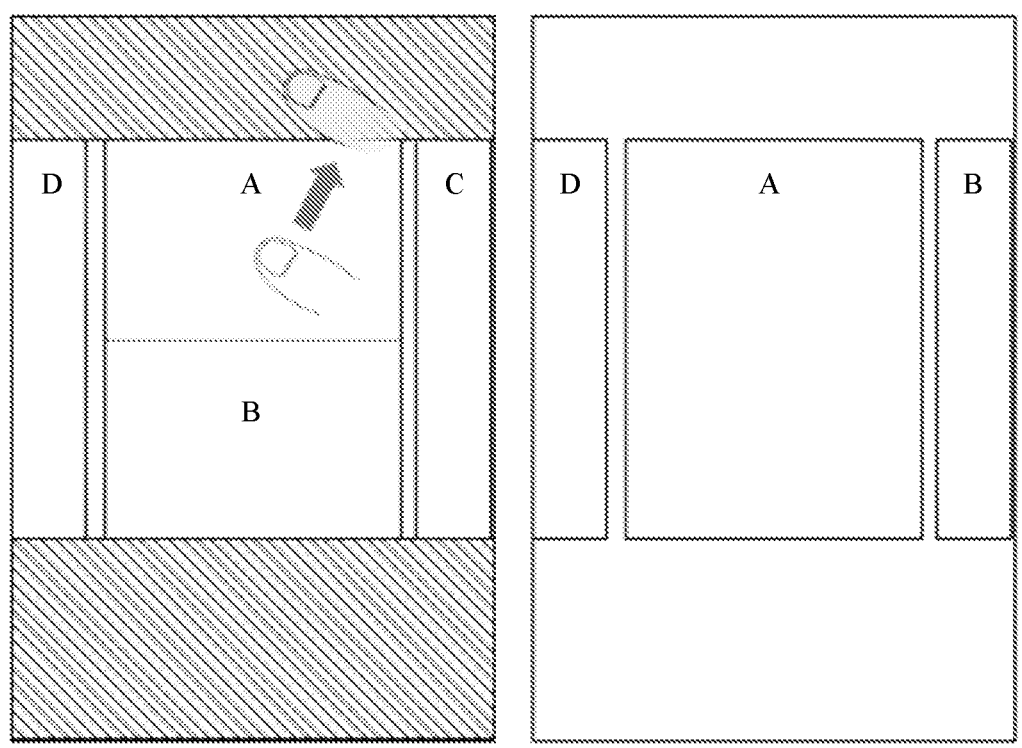
FIG. 15 is a schematic diagram of releasing an application for which screen splitting is performed according to an embodiment of this application.

On the second interface, two-screen splitting is used as an example. After screen splitting is completed for the applications A and B, a split-screen release operation may be completed by dragging an application card in a split-screen card to a public area. The public area includes an area in which there is no application card, for example, an area filled with diagonal textures in FIG. 15. The card dragged to the public area becomes an independent application card again after being released. As shown in a right figure in FIG. 15, the preview card of the application A becomes an independent application card again after being dragged to the public area. If screen splitting is originally performed for only two applications, the other application is also restored to an independent application card. As shown in the right figure in FIG. 15, after the application A is dragged to the public area for split-screen release, the application B is also restored to an independent application card.

It may be understood that a principle of replacing and releasing a multi-application split-screen card is the same as that of replacing and releasing a two-application split-screen card. A difference lies in that for a split-screen card that includes N applications, after an application corresponding to one preview card is released, a split-screen card that includes (N−1) applications is displayed on the second interface.

In this embodiment of the present invention, screen splitting is implemented by dragging a preview card of an application to a preview card of another application, and the operation is more intuitive. In this operation manner in this embodiment of the present invention, a plurality of multi-application split-screen cards may coexist, as shown in FIG. 12, and the operation is more flexible. In this embodiment, a screen splitting habit of the user for a specific application is recorded, and the specific application is displayed at a position determined based on the habit of the user, thereby achieving better user experience.

Embodiment 2: An instruction for dragging at least one of preview cards to a specified screen splitting activation area or screen splitting icon is received, and a second interface is displayed.

A difference between Embodiment 2 and Embodiment 1 lies in that screen splitting is not activated in the manner of dragging a preview card of an application to a preview card of another application, but instead is activated in a manner in which the screen splitting activation area or screen splitting icon at a specified position is set, and split-screen display is triggered by moving a preview card of an application to the screen splitting activation area or screen splitting icon at the specified position.

Step 1 and step 2 in Embodiment 2 are respectively the same as step 1 and step 2 in Embodiment 1.

Steps 3 and 4: Receive an instruction for dragging the at least one of the preview cards to a specified position, or receive an instruction for dragging the at least one of the preview cards to the specified screen splitting icon, and display the second interface.

Figure 16:
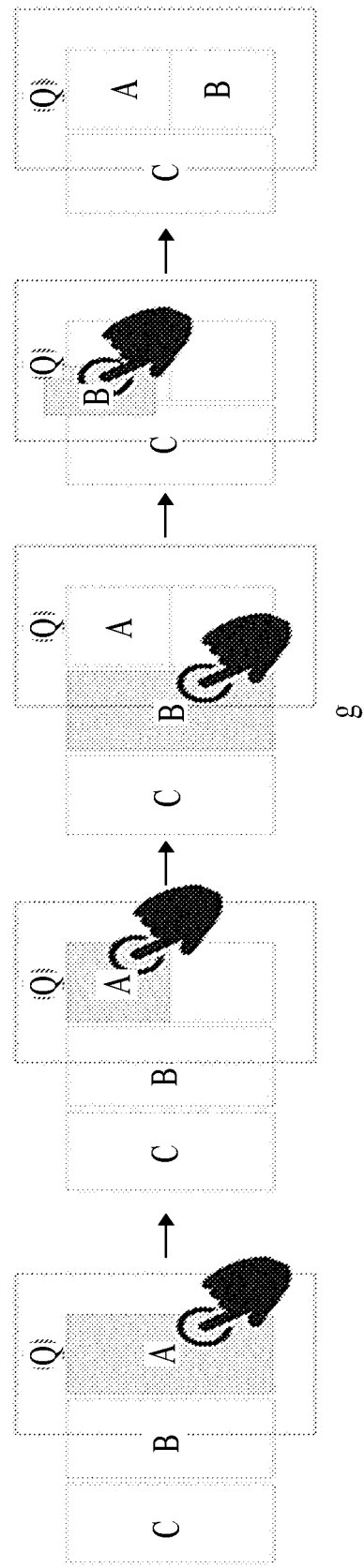
FIG. 16 is a schematic diagram of dragging a preview card of an application to a screen splitting activation area or a screen splitting icon according to an embodiment of this application.

An example in which a multi-application interface is horizontally arranged and screen splitting is performed for two applications is used. As shown in FIG. 16, a preview card of an application A is dragged to the screen splitting activation area Q, and the preview card of the application A becomes a split-screen card, and occupies one block position, and the other position is vacant. A preview card of an application B is then dragged to the screen splitting activation area Q, or a preview card of an application B is dragged to the vacant position, to generate a split-screen card of the applications A and B.

It may be understood that the screen splitting activation area Q may alternatively be a screen splitting icon. The preview card of the application A is dragged to the screen splitting icon, and the preview card of the application A becomes a split-screen card, and occupies one block position, and the other position is vacant. The preview card of the application B is then dragged to the screen splitting icon, or the preview card of the application B is dragged to the vacant position, to generate the split-screen card of the applications A and B.

Further, a system may record a historical application split-screen arrangement position, collect, based on the historical application split-screen arrangement position, statistics on a behavior rule of performing screen splitting by a user, and lay out an arrangement position of an application on the second interface based on the behavior rule of performing screen splitting by the user. For example, a learning module may be displayed in a display module, and is configured to collect the statistics on the behavior rule of the user. The behavior rule includes a position, on the second interface, at which each of the application A and the application B is placed by the user when screen splitting is currently performed for the application A and the application B. A habit of the user is learned by collecting the statistics on the behavior rule of performing screen splitting by the user, for example, collecting statistics on frequency of an arrangement position, and subsequently an application is arranged at a corresponding position based on the habit of the user during screen splitting. For example, during screen splitting, the application A is usually located in an upper half part of the second interface. In this case, after the second instruction is received, when the second interface is displayed, the application A appears in an upper half part of a screen by default in this embodiment of the present invention.

Optionally, after the second interface is displayed, a horizontal or vertical position of an application corresponding to the at least one preview card displayed in at least one display area on the second interface may be adjusted by dragging the application. This operation is the same as the operation of adjusting a horizontal or vertical position of an application in Embodiment 1.

Optionally, after the second interface is displayed, the application corresponding to the at least one preview card displayed in the at least one display area on the second interface may be further replaced or released. This operation is the same as the replacement or release operation in Embodiment 1.

In this embodiment, a screen splitting habit of the user for a specific application is recorded, and the specific application is displayed at a position determined based on the habit of the user, thereby achieving better user experience.

Embodiment 3: An instruction for selecting at least one of preview cards is received, an instruction for tapping a screen splitting button or a screen splitting icon is received, and a second interface is displayed.

As an alternative implementation, Embodiment 3 is enhanced on the basis of Embodiment 2. Steps 1 and 2 are the same as those in Embodiment 2. Steps 3 and 4 in this embodiment of the present invention are described as follows:

Step 3: Select a preview card for which screen splitting is to be performed, where to select the preview card for which screen splitting is to be performed, a check box may be displayed in a corner of a preview card of each application for selection, and then tap the screen splitting button or the screen splitting icon to display the second interface.

Figure 17:
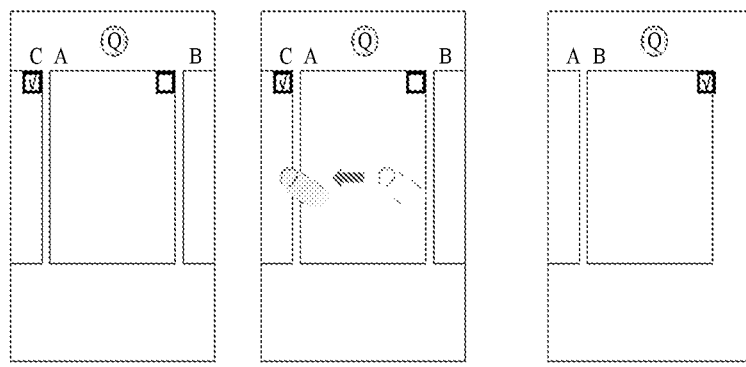
FIG. 17 is a schematic diagram of selecting an application by tapping a check box in an upper right corner of a preview card of the application and then performing screen splitting according to an embodiment of this application.
Figure 18:
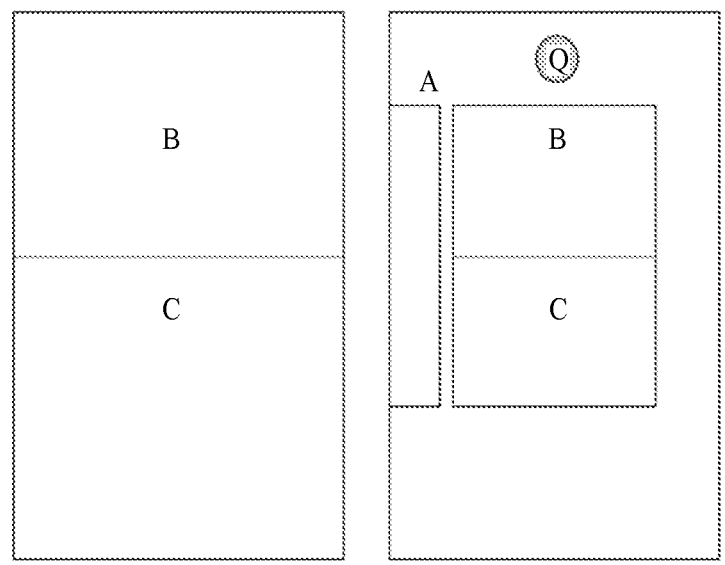
FIG. 18 is a schematic diagram of a result of selecting an application by tapping a check box in an upper right corner of a preview card of the application and then performing screen splitting according to an embodiment of this application.

As shown in FIG. 17, for example, a user starts three applications A, B, and C. After the user invokes a multi-application switching interface, the screen splitting icon Q is displayed in an upper part of the interface. A position of the screen splitting icon is merely an example. It may be understood that the screen splitting icon may be in the upper part, a lower part, or another position of the interface. Operation steps for performing screen splitting include:

(a) tap a check box in an upper right corner of a preview card of the application C to select the application C, as shown in a left figure in FIG. 17;

(b) slide the multi-application interface leftward, as shown in a middle figure in FIG. 17, and select the application B when a preview interface of the application B appears on a current visual interface; and (c) tap the screen splitting icon Q. In this case, the selected applications C and B are displayed in a preset display manner on split screens, as shown in FIG. 18. The preset display manner includes horizontal screen splitting or vertical screen splitting.

In this case, if the user invokes display of the multi-application switching interface again, the applications B and C are simultaneously displayed in one application preview card, as shown on the right of FIG. 18. In the screen splitting triggering manner in this embodiment, setting of a display manner and a display position of the selected applications is not limited in the present invention. The display manner and the display position of the selected applications include:

(a) a sequence of displaying the applications, where in this example, the application B that is selected later is displayed at an upper position, and the application C that is selected first is displayed at a lower position; and (b) a position at which an application split-screen card is displayed, which includes whether the application split-screen card is displayed at an original position of the application that is selected first or at an original position of the application that is selected later. In this example, a split-screen card of the applications B and C is displayed at an original position of the application B that is selected later.

Further, a system may record a historical application split-screen arrangement position, collect, based on the historical application split-screen arrangement position, statistics on a behavior rule of performing screen splitting by the user, and lay out an arrangement position of an application on the second interface based on the behavior rule of performing screen splitting by the user. For example, a learning module may be displayed in a display module, and is configured to collect the statistics on the behavior rule of the user. The behavior rule includes a position, on the second interface, at which each of the application A and the application B is placed by the user when screen splitting is currently performed for the application A and the application B. A habit of the user is learned by collecting the statistics on the behavior rule of performing screen splitting by the user, for example, collecting statistics on frequency of an arrangement position, and subsequently an application is arranged at a corresponding position based on the habit of the user during screen splitting. For example, during screen splitting, the application A is usually located in an upper half part of the second interface. In this case, after the second instruction is received, when the second interface is displayed, the application A appears in an upper half part of a screen by default in this embodiment of the present invention.

Optionally, after the second interface is displayed, a horizontal or vertical position of an application corresponding to the at least one preview card displayed in at least one display area on the second interface may be adjusted by dragging the application. This operation is the same as the operation of adjusting a horizontal or vertical position of an application in Embodiment 1.

Optionally, after the second interface is displayed, the application corresponding to the at least one preview card displayed in the at least one display area on the second interface may be further replaced or released. This operation is the same as the replacement or release operation in Embodiment 1.

In this embodiment, screen splitting may be implemented for a plurality of applications, and a plurality of split-screen cards can coexist on the second interface, which is more flexible.

In this embodiment, an operation manner of selecting an application and then triggering screen splitting is provided, and a quantity of parts into which the screen needs to be divided may be determined based on a quantity of applications selected by the user. Different from the manners in Embodiment 1 and Embodiment 2, this manner is implemented as follows: One application is first dragged, and the multi-application split-screen interface is displayed on two split screens, then another application is dragged, and the multi-application split-screen interface is displayed on three split screens, and so on. The operation in this embodiment is more user-friendly and concise.

In this embodiment, a screen splitting habit of the user for a specific application is recorded, and the specific application is displayed at a position determined based on the habit of the user, thereby achieving better user experience.

Embodiment 4: An instruction for sliding the at least one preview card is received, or an instruction for simultaneously and respectively sliding two of preview cards with two fingers is received, and a second interface is displayed.

In an alternative implementation, a user may slide the at least one preview card or simultaneously and respectively slide the two preview cards with the two fingers to trigger screen splitting. In this embodiment, downward sliding is used as an example. Step 1 and step 2 in Embodiment 4 are the same as those in Embodiment 1. Steps 3 and 4 in this embodiment of the present invention are described as follows:

Steps 3 and 4:

An implementable manner includes: On a multi-application interface, a preview card of an application is slid downward, another application for which screen splitting is to be performed is selected through leftward and rightward sliding in a card area, downward sliding is performed again, and by analogy, a third or fourth application may be further selected. These applications exist on the multi-application interface in the form of split-screen cards. When the user taps the split-screen card, a corresponding split-screen interface is displayed.

Figure 19:
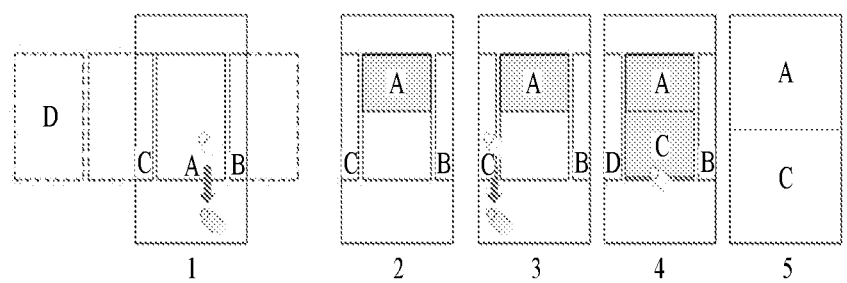
FIG. 19 is a schematic diagram of downward sliding a preview card of an application to trigger screen splitting and displaying a split-screen interface according to an embodiment of this application.

As shown in FIG. 19(1), two-screen splitting is used as an example. On the multi-application interface, the user slides downward a preview card of an application A to trigger split-screen display, and the preview card of the application A becomes a half-screen preview card, as shown in FIG. 19(2). The user selects a preview card of another application, and slides downward the preview card, as shown in FIG. 19(3). If the user selects a preview card of an application C, the preview card of the application C is displayed in a lower half part of the split-screen preview card. The user taps the split-screen card of A and C, as shown in FIG. 19(4), and a split-screen display interface is entered, as shown in FIG. 19(5).

It may be understood that after screen splitting, a multi-application split-screen card (as shown in FIG. 19(4)) is displayed on a screen, and whether the user needs to tap the card to display a multi-application split-screen interface (as shown in FIG. 19 (5)) or whether to directly display a multi-application split-screen interface (as shown in FIG. 19(5)) is determined by an implementation of an electronic device. This is not limited in the present invention.

Figure 21:
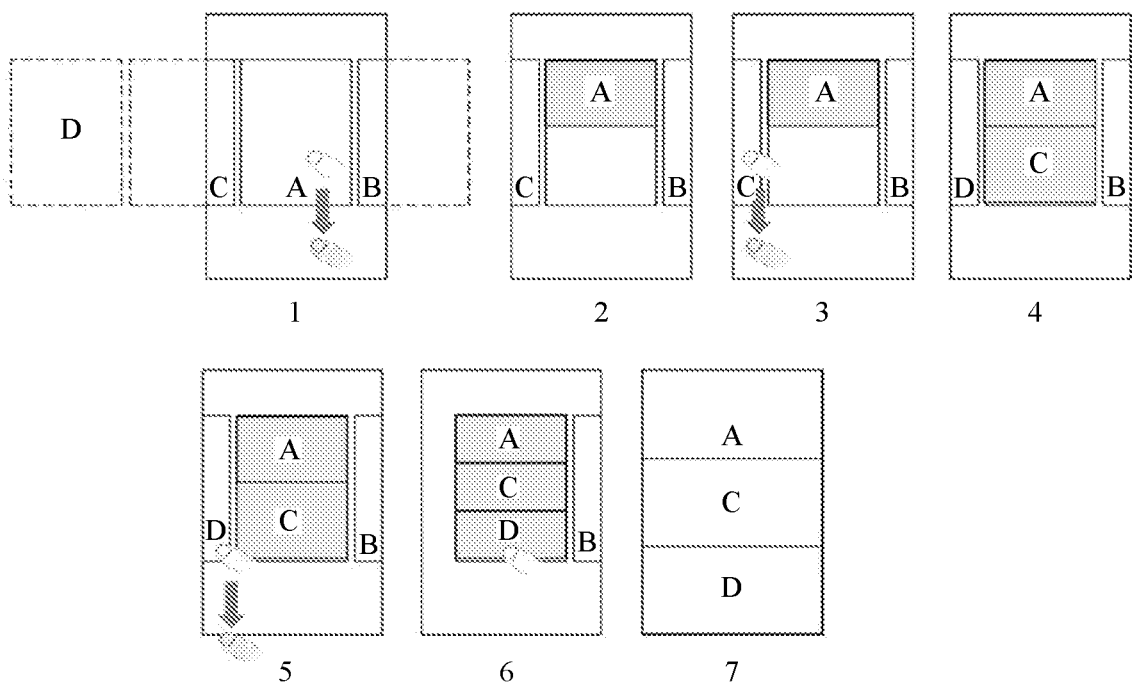
FIG. 21 is a schematic diagram of downward sliding a preview card of an application to trigger three-screen splitting according to an embodiment of this application.

Three-screen splitting is further used as an example. As shown in FIG. 21, preceding steps are the same as the steps of two-screen splitting. On the basis of two-screen splitting, the user continues to select and slide a preview card of a next application D for which screen splitting is to be performed. In this case, the preview cards of A, C, and D are displayed in three equal parts in a split-screen preview card. The user taps the split-screen card of A, C, and D, as shown in FIG. 21(6), and a split-screen display interface is entered, as shown in FIG. 21(7).

Figure 20:
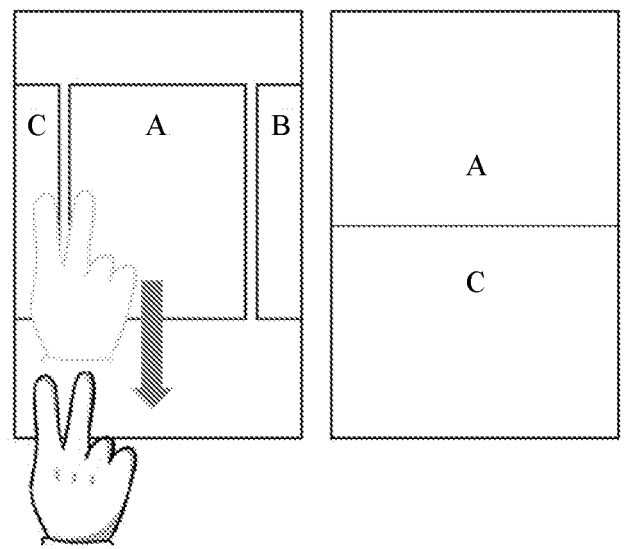
FIG. 20 is a schematic diagram of simultaneously sliding preview cards of applications with two fingers to trigger screen splitting according to an embodiment of this application.

In another implementable manner, two fingers of the user may simultaneously perform sliding. Two-screen splitting is used as an example. In this case, one finger slides a preview card of a first application, and the other finger slides a preview card of another application. After sliding is simultaneously performed, screen splitting for the two applications is triggered. As shown in FIG. 20, the two fingers simultaneously slide the preview cards of the applications A and C to trigger split-screen display of the applications A and C.

In this embodiment of the present invention, a distance, duration, or strength of the sliding action is directly proportional to a size of at least one of at least two display areas. In this manner, the display areas on the second interface can differ in size, in other words, the display areas on the second interface are not display areas of a same size.

A relationship between the size of the display area and each of the sliding distance, duration, and strength may include:
  (a) When the distance of the sliding action is greater than or equal to a preset threshold, the display area is displayed in a relatively large proportion, or when the distance of the sliding action is less than a preset threshold, the display area is displayed in a relatively small proportion. The preset threshold and the proportion are set based on the electronic device. This is not limited in the present invention.
  (b) When the duration of the sliding action is greater than or equal to a time threshold, the display area is displayed in a relatively large proportion, or when the duration of the sliding action is less than a preset threshold, the display area is displayed in a relatively small proportion. The preset threshold and the proportion are set based on the electronic device. This is not limited in the present invention.
  (c) When a touchscreen detects that touch strength is greater than or equal to a preset threshold, the display area is displayed in a relatively large proportion, or when touch strength is less than a preset threshold, the display area is displayed in a relatively small proportion. The preset threshold and the proportion are set based on the electronic device. This is not limited in the present invention.

Figure 22:
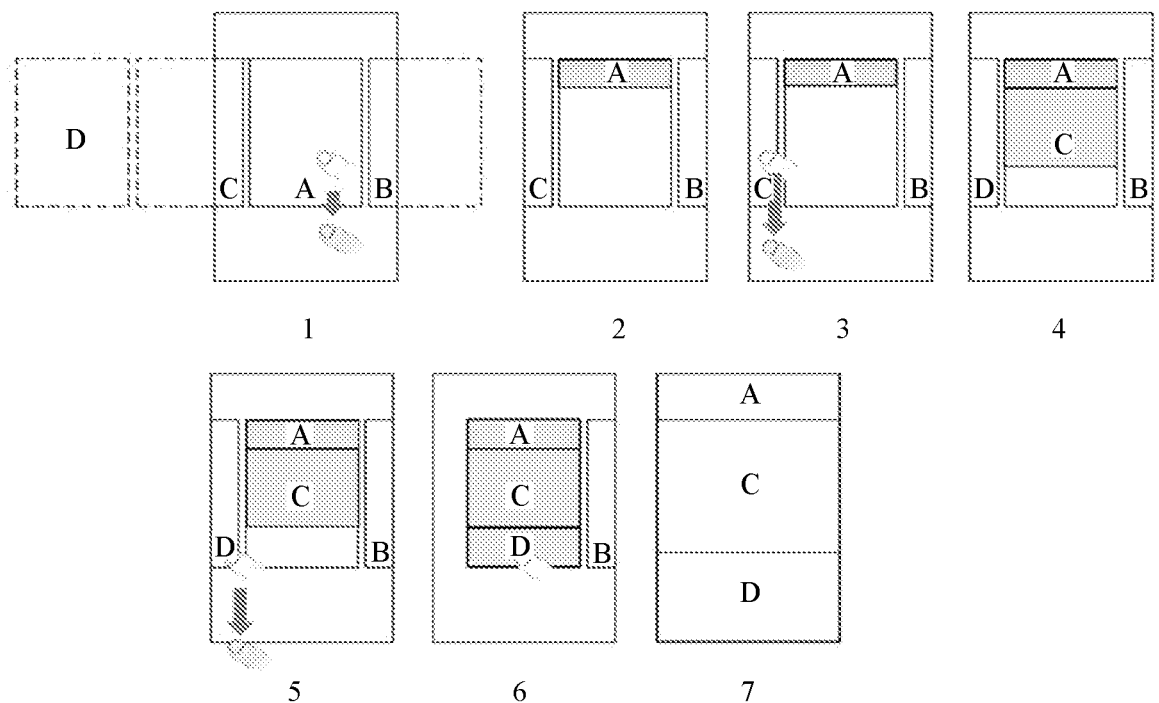
FIG. 22 is a schematic diagram of a correspondence between a sliding distance and a display size of a split-screen card on a screen according to an embodiment of this application.

As shown in FIG. 22, the distance of the sliding action is used as an example. If the user slides the preview card of the application A at a relatively short sliding distance, as shown in FIG. 22(1), where the sliding distance is represented by using an arrow length, the application A is previewed in a relatively small proportion, as shown in FIG. 22(2). If the user slides the preview card of the application C at a relatively long sliding distance, as shown in FIG. 22(3), the application C is previewed in a relatively large proportion, as shown in FIG. 22(4). If the user slides the preview card of the application D at a medium sliding distance, as shown in FIG. 22(5), the application D is previewed in a medium proportion. Setting of the threshold of the sliding distance and a correspondence between the sliding distance and a display size of the screen are not limited in the present invention. In this example, there are two distance thresholds and three sliding distance levels. Alternatively, only one distance threshold and two sliding distance levels may be set. When N distance thresholds and (N+1) sliding distances are set, specific setting of N is not limited in the present invention.

Optionally, a system may record a historical application split-screen arrangement position, collect, based on the historical application split-screen arrangement position, statistics on a behavior rule of performing screen splitting by the user, and lay out an arrangement position of an application on the second interface based on the behavior rule of performing screen splitting by the user. For example, a learning module may be displayed in a display module, and is configured to collect the statistics on the behavior rule of the user. The behavior rule includes a position, on the second interface, at which each of the application A and the application B is placed by the user when screen splitting is currently performed for the application A and the application B. A habit of the user is learned by collecting the statistics on the behavior rule of performing screen splitting by the user, for example, collecting statistics on frequency of an arrangement position, and subsequently an application is arranged at a corresponding position based on the habit of the user during screen splitting. For example, during screen splitting, the application A is usually located in an upper half part of the second interface. In this case, after the second instruction is received, when the second interface is displayed, the application A appears in an upper half part of the screen by default in this embodiment of the present invention.

Optionally, after the second interface is displayed, a horizontal or vertical position of an application corresponding to the at least one preview card displayed in the at least one display area on the second interface may be adjusted by dragging the application. This operation is the same as the operation of adjusting a horizontal or vertical position of an application in Embodiment 1.

Optionally, after the second interface is displayed, the application corresponding to the at least one preview card displayed in the at least one display area on the second interface may be further replaced or released. This operation is the same as the replacement or release operation in Embodiment 1.

In this embodiment, screen splitting may be implemented for a plurality of applications, and a plurality of split-screen cards can coexist on the multi-application interface, which is more flexible.

In this embodiment, a screen splitting habit of the user for a specific application is recorded, and the specific application is displayed at a position determined based on the habit of the user, thereby achieving better user experience.

Embodiment 5: Screen splitting is performed for a plurality of applications on an electronic device with a foldable screen.

A difference between this embodiment of the present invention and another embodiment lies in that this embodiment of the present invention is applied to a foldable screen scenario. For ease of description, the foldable screen is divided into two types of display areas: a main screen, a sub-screen, and an expanded screen (namely, a status obtained after the main screen and the sub-screen are combined).

There is a rotation mechanism between the main screen and the sub-screen. The rotation mechanism includes a rotating shaft and an angle sensor. The rotating shaft is configured to implement folding and rotation of the foldable screen. The angle sensor is configured to detect an angle between the main screen and the sub-screen. A possible implementation is to install an IMU (an inertial navigation apparatus with functions of a gyroscope and an accelerometer) on each of the main screen and the sub-screen, measure a horizontal angle of each of the main screen and the sub-screen, and obtain an angle difference between the main screen and the sub-screen through calculation. In this application, the method in this embodiment is described by using an example in which the mobile phone is in a folded state when the angle difference between the main screen and the sub-screen is 0°, and the mobile phone is in an expanded state when the angle difference between the main screen and the sub-screen is 180°. When the angle of the mobile phone falls within (0°, 180°), it indicates that the mobile phone is in an expansion process or a folding process. A process in which the angle difference between the main screen and the sub-screen of the mobile phone gradually increases from 0° to 180° is referred to as the expansion process of the mobile phone, and a process in which the angle difference between the main screen and the sub-screen of the mobile phone gradually decreases from 180° to 0° is referred to as the folding process of the mobile phone.

Each stacked structure of a cover (Cover) and a panel (Panel) in the foldable flexible screen may be made of a foldable flexible material. This is not limited in the present invention.

Step 1 and step 2 in Embodiment 5 are the same as step 1 and step 2 in Embodiment 1.

For example, for the mobile phone, five applications A, B, C, D, and E are running in the foreground.

In step 3, for a screen splitting triggering operation, any manner in Embodiment 1, Embodiment 2, Embodiment 3, or Embodiment 4 may be selected.

Step 4 is described below by using an example in which two-screen splitting is performed, that is, the application A and the application B participate in screen splitting.

Step 4: In the foldable screen scenario, displaying a second interface includes the following case (a), (b), (c), or (d):

(a) When the electronic device is in the folded state, the second interface is displayed in a same manner as that of displaying the second interface on a mobile phone with a non-foldable screen, that is, the second interface is displayed on a first screen or a second screen.

Figure 23:
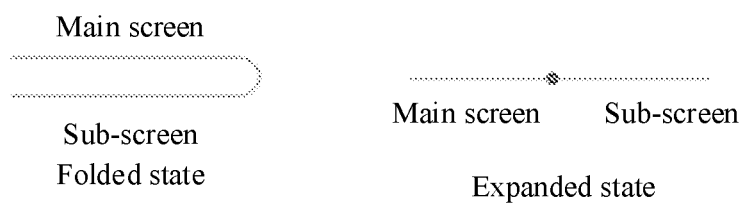
FIG. 23 is a schematic diagram of a foldable display screen according to an embodiment of this application.
Figure 24:
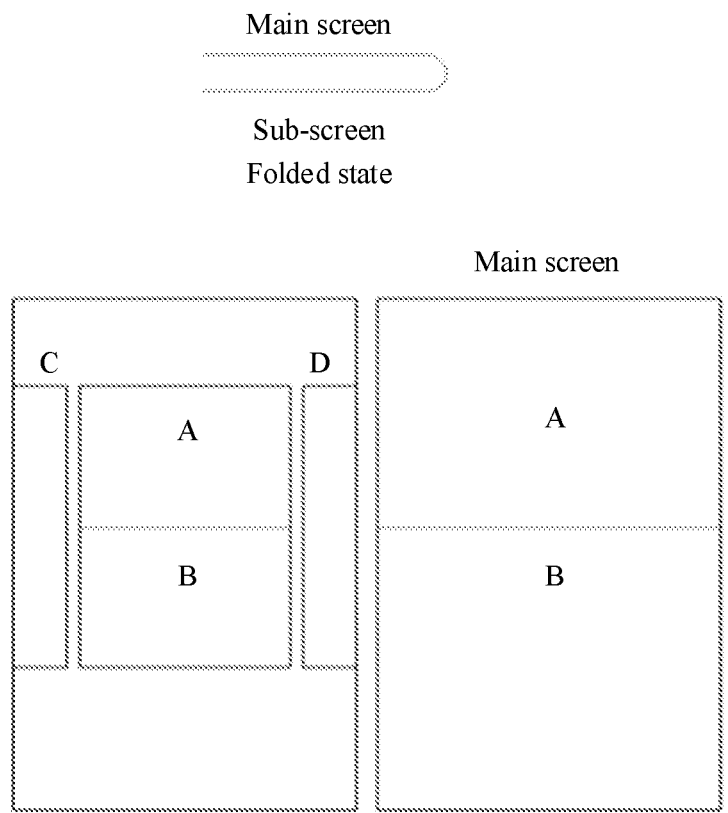
FIG. 24 is a schematic diagram of split-screen display in a folded state according to an embodiment of this application.

Specifically, when the mobile phone is in a status shown in a left figure in FIG. 23, a display manner on the main screen is the same as that on the mobile phone with the non-foldable screen. In a possible implementation, as shown in FIG. 24, the applications A and B are presented on a split-screen display interface on the main screen.

(b) When the foldable screen is in the expanded state, display content in at least two display areas on the second interface is respectively displayed on a first screen and a second screen of the foldable screen, where different content is displayed on the first screen and the second screen.

Figure 25:
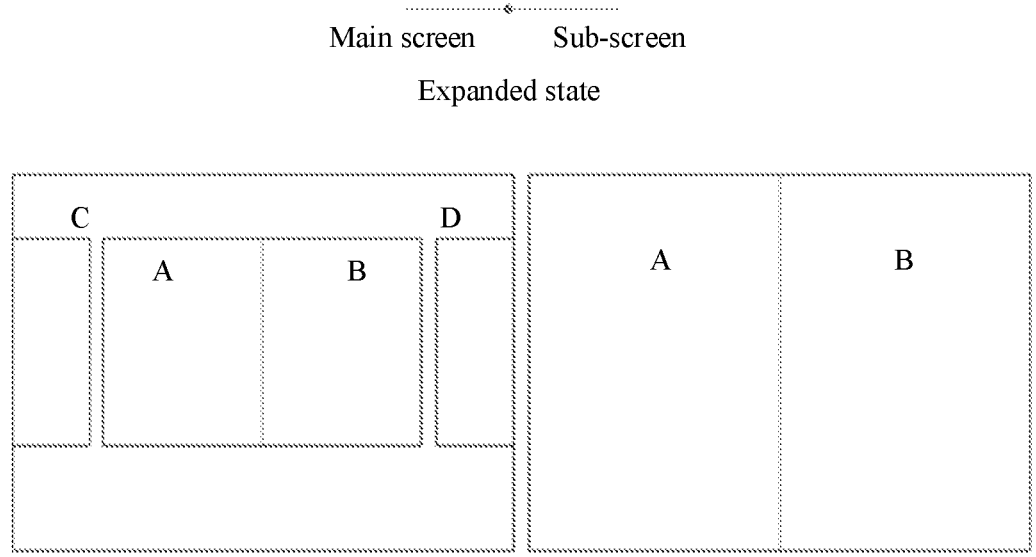
FIG. 25 is a schematic diagram of split-screen display in an expanded state according to an embodiment of this application.

Specifically, when the mobile phone is in a status shown in a right figure in FIG. 23, display of a multi-application switching interface is similar to that in FIG. 8. After screen splitting, preview cards of the applications for which screen splitting is performed are horizontally arranged, as shown in a left figure in FIG. 25. A split-screen card of the applications A and B is tapped, and an application split-screen interface is displayed, as shown on the right in FIG. 25. When the mobile phone is in the expanded state, the preview cards of the applications for which screen splitting is performed may be alternatively vertically arranged. This is not limited in the present invention.

(c) In a process in which the foldable screen changes from the folded state to the expanded state, the second interface is displayed from one screen to two screens.

Figure 26:
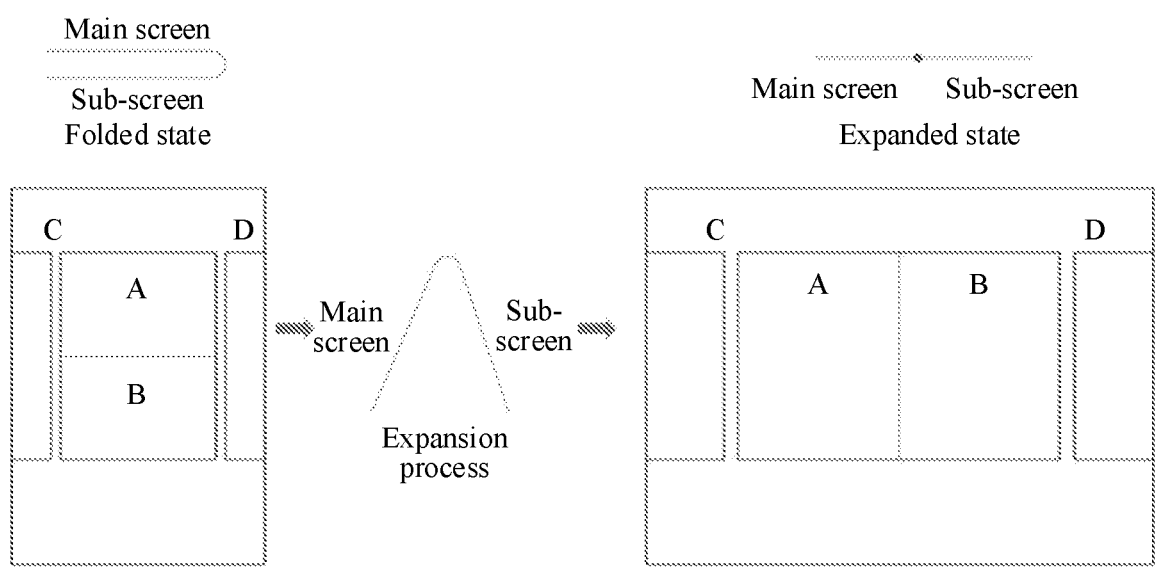
FIG. 26 is a schematic diagram of split-screen display in an expansion process according to an embodiment of this application.

Specifically, when a user expands the screen of the mobile phone in the folded state, and the angle sensor detects that the angle between the main screen and the sub-screen changes from 0 degrees to >0 degrees until the angle changes to 180 degrees, the application A is restored for full screen display on the main screen, and the application B is displayed in full screen on the sub-screen. A display effect is shown in FIG. 26.

(d) In a process in which the foldable screen changes from the expanded state to the folded state, the second interface is displayed from two screens to one screen. A foldable screen to be folded inwards or a foldable screen to be folded outwards is supported in the present invention. This is not limited in the present invention.

Specifically, when the user folds the screen in the expanded state, and the angle sensor detects that the angle between the main screen and the sub-screen gradually changes from 180 degrees to 0 degrees, the application A is changed to be displayed in an upper half part of the main screen, and the application B is changed to be displayed in a lower half part of the main screen. This implementation is the same as the display manner described in (a).

It may be understood that if the user expands the device with the foldable screen under the multi-application interface in (a), the multi-application interface in (b) may be displayed. If the user folds the device with the foldable screen under the multi-application interface in (b), the multi-application interface in (a) may be displayed.

Further, a system may record a historical application split-screen arrangement position, collect, based on the historical application split-screen arrangement position, statistics on a behavior rule of performing screen splitting by the user, and lay out an arrangement position of an application on the second interface based on the behavior rule of performing screen splitting by the user. For example, a learning module may be displayed in a display module, and is configured to collect the statistics on the behavior rule of the user. The behavior rule includes a position, on the second interface, at which each of the application A and the application B is placed by the user when screen splitting is currently performed for the application A and the application B. A habit of the user is learned by collecting the statistics on the behavior rule of performing screen splitting by the user, for example, collecting statistics on frequency of an arrangement position, and subsequently an application is arranged at a corresponding position based on the habit of the user during screen splitting. For example, during screen splitting, the application A is usually located in an upper half part of the second interface. In this case, after the second instruction is received, when the second interface is displayed, the application A appears in an upper half part of the screen by default in this embodiment of the present invention.

Optionally, after the second interface is displayed, a horizontal or vertical position of an application corresponding to at least one preview card displayed in at least one display area on the second interface may be adjusted by dragging the application. This operation is the same as the operation of adjusting a horizontal or vertical position of an application in Embodiment 1.

Optionally, after the second interface is displayed, the application corresponding to the at least one preview card displayed in the at least one display area on the second interface may be further replaced or released. This operation is the same as the replacement or release operation in Embodiment 1.

In this embodiment, different statuses of the foldable screen may be identified, and a plurality of applications are displayed on the foldable screen after screen splitting is performed.

An embodiment of the present invention further provides a computer storage medium. The computer storage medium includes computer instructions. When the computer instructions are run on the foregoing electronic device, the electronic device is enabled to perform the functions or the steps performed by the mobile phone in the foregoing method embodiments.

An embodiment of the present invention further provides a computer program product. When the computer program product is run on a computer, the computer is enabled to perform the functions or the steps performed by the mobile phone in the foregoing method embodiments.

The foregoing descriptions about implementations allow a person skilled in the art to understand that, for the purpose of convenient and brief description, only division into the foregoing functional modules is used as an example for illustration. In actual application, the foregoing functions may be allocated to different functional modules and implemented based on a requirement, that is, an inner structure of an apparatus is divided into different functional modules to implement all or some of the functions described above.

In the several embodiments provided in the present invention, it should be understood that the disclosed apparatus and method may be implemented in other manners. For example, the described apparatus embodiment is merely an example. For example, division into the modules or units is merely logical function division and may be other division in an actual implementation. For example, a plurality of units or components may be combined or integrated into another apparatus, or some features may be ignored or not performed.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes any medium that can store program code, for example, a USB flash drive, a removable hard disk, a read only memory (ROM), a random access memory (RAM), a magnetic disk, or an optical disc.

The foregoing content is merely specific implementations of the present invention, but is not intended to limit the protection scope of the present invention. Any variation or replacement within the technical scope disclosed in the present invention shall fall within the protection scope of the present invention. Therefore, the protection scope of the present invention shall be subject to the protection scope of the claims.

What is claimed is:

1. A screen splitting method by an electronic device with a foldable screen having a first screen and a second screen, the method comprising:
receiving a first instruction;
displaying a first interface in response to the first instruction, wherein the first interface comprises preview cards of applications that are not closed;
receiving a second instruction for at least one of the preview cards; and
displaying a second interface according to the second instruction, wherein the second interface comprises a split-screen card, and the split-screen card comprises at least two display areas, and each of the display areas corresponds to a respective preview card, and an application corresponding to the at least one preview card is displayed in at least one display area;
recording a plurality of historical application split-screen arrangement positions for a plurality of applications;
collecting statistics on the plurality of historical split-screen arrangement positions for the plurality of applications based on a habit of a user wherein the statistics include a frequency of the plurality of historical split-screen arrangement positions;
determining a value P for an angle alpha either by obtaining a user specified value for the value P or by determining the value P based on use habits by the user or a plurality of other users, to determine whether the electronic device is in a folded state or an expanded state;
in response to determining the value P, based on a change in the angle alpha, transition from a folded state to an expanded state, expanding a first preview card of the preview cards to a full screen view of the first screen and a second preview card of the preview cards to a full screen view of the second screen; and
in response to determining the value P, based on a second change in the angle alpha, transition from an expanded state to a folded state, switching from the full screen views of the first and second preview cards to the split screen view of the first and second cards at the first screen.

2. The method according to claim 1, wherein the preview card is a card generated when an application exits a current application interface, and the exiting a current application interface comprises returning to a home screen or invoking multi-application switching.

3. The method according to claim 1, wherein the receiving a second instruction for at least one of the preview cards and displaying a second interface according to the second instruction comprises any one of the following manners:
(a) receiving an instruction for dragging the at least one preview card, and displaying the second interface when a dragging position enters a boundary position of a second preview card in the preview cards;
(b) receiving an instruction for dragging the at least one preview card to a specified position, and displaying the second interface;
(c) receiving an instruction for dragging the at least one preview card to a specified screen splitting icon, and displaying the second interface;
(d) receiving an instruction for selecting the at least one preview card, receiving an instruction for tapping a screen splitting button or a screen splitting icon, and displaying the second interface;
(e) receiving an instruction for sliding the at least one preview card, and displaying the second interface; or
(f) receiving an instruction for simultaneously and respectively sliding two of the preview cards with two fingers, and displaying the second interface.

4. The method according to claim 3, wherein in the two manners (e) and (f), a distance, duration, or strength of the sliding action is directly proportional to a size of the at least one of the at least two display areas.

5. The method according to claim 1, wherein the displaying a second interface comprises:
when the foldable screen is in an expanded state, respectively displaying display content in the at least two display areas on the second interface on a first screen and a second screen of the foldable screen, wherein different content is displayed on the first screen and the second screen.

6. The method according to claim 1, further including wherein the displaying a second interface further comprises:
in a process in which the foldable screen changes from a folded state to an expanded state, displaying the second interface from one screen to two screens; or
in a process in which the foldable screen changes from an expanded state to a folded state, displaying the second interface from two screens to one screen.

7. The method according to claim 1, wherein the method further comprises:
displaying a third interface if the first instruction is received again after the second interface is displayed, wherein the third interface comprises at least one split-screen card, the split-screen card comprises at least two display areas, and the application corresponding to the at least one preview card is displayed in at least one display area.

8. The method according to claim 1, further including releasing the application corresponding to the at least one preview card displayed in the at least one display area on the second interface by:
receiving an instruction for dragging an application displayed in any display area of the split-screen card, and when the application is dragged to a public area, restoring the application and displaying the application in an independent preview card, wherein the public area is an area in which there is no preview card or split-screen card.

9. The method according to claim 1, wherein the method further comprises:
recording a historical application split-screen arrangement position, and collecting, based on the historical application split-screen arrangement position, statistics on a behavior rule of performing screen splitting by a user; and
the displaying a second interface comprises: laying out an arrangement position of an application on the second interface based on the behavior rule of performing screen splitting by the user.

10. The method of claim 1 further including training a machine learning module to select a historical split-screen arrangement position based on the pair of instructions.

11. An electronic device with a foldable screen having a first screen and a second screen, wherein the electronic device comprises a processor and a memory, the memory is configured to: store a computer program and run data, the computer program com prises instructions, and when the instructions are executed by the processor, the electronic device is enabled to perform a method comprising:

receiving a first instruction;

displaying a first interface in response to the first instruction, wherein the first interface comprises preview cards of applications that are not closed;

receiving a second instruction for at least one of the preview cards; and displaying a second interface according to the second instruction, wherein the second interface comprises a split-screen card, and the split-screen card comprises at least two display areas, and each of the display areas corresponds to one preview card, and an application corresponding to the at least one preview card is displayed in at least one display area;

providing input to the application to more than one card without changing a preview card configuration, the application corresponding to the at least one preview card displayed in the at least one display area on the second interface-; and recording a plurality of historical application split-screen arrangement positions for a plurality of applications;

collecting statistics on the plurality of historical split-screen arrangement positions for the plurality of applications based on a habit of a user wherein the statistics include a frequency of the plurality of historical split-screen arrangement positions; and determining a value P for an angle alpha either by obtaining a user specified value for an angle the value P or by determining the value P based on use habits by the user or a plurality of other users, to determine whether the electronic device is in a folded state or an expanded state;

in response to determining, based on a change in the angle alpha, transition from a folded state to an expanded state, expanding one a first preview card of the respective preview cards to a full screen view of the first screen and a second preview card of the preview cards to a full screen view of the second screen; and in response to determining, based on a second change in the angle alpha, transition from an expanded state to a folded state, switching from the full screen views of the first and second preview cards to the split screen view of the first and second cards at the first screen.

12. The electronic device according to claim 11, wherein the preview card is a card generated when an application exits a current application interface, and the exiting a current application interface comprises returning to a home screen or invoking multi-application switching.

13. The electronic device according to claim 11, wherein the receiving a second instruction for at least one of the preview cards and displaying a second interface according to the second instruction comprises any one of the following manners:

(a) receiving an instruction for dragging the at least one preview card, and displaying the second interface when a dragging position enters a boundary position of a second preview card in the preview cards;

(b) receiving an instruction for dragging the at least one preview card to a specified position, and displaying the second interface;

(c) receiving an instruction for dragging the at least one preview card to a specified screen splitting icon, and displaying the second interface;

(d) receiving an instruction for selecting the at least one preview card, receiving an instruction for tapping a screen splitting button or a screen splitting icon, and displaying the second interface;

(e) receiving an instruction for sliding the at least one preview card, and displaying the second interface; or (f) receiving an instruction for simultaneously and respectively sliding two of the preview cards with two fingers, and displaying the second interface.

14. The electronic device according to claim 11, wherein the method further comprises:

displaying a third interface if the first instruction is received again after the second interface is displayed, wherein the third interface comprises at least one split-screen card, the split-screen card comprises at least two display areas, and the application corresponding to the at least one preview card is displayed in at least one display area.

15. The electronic device according to claim 11, wherein the releasing the application corresponding to the at least one preview card displayed in the at least one display area on the second interface comprises:

receiving an instruction for dragging an application displayed in any display area of the split-screen card, and when the application is dragged to a public area, restoring the application and displaying the application in an independent preview card, wherein the public area is an area in which there is no preview card or split-screen card.

16. The apparatus of claim 11 further including training a machine learning module to select a historical split-screen arrangement position based on the pair of instructions.

17. A non-transitory computer storage medium, comprising a computer program, wherein when the computer program is run on an electronic device with a foldable screen having a first screen and a second screen, the electronic device performs the steps of:

receiving a first instruction;

displaying a first interface in response to the first instruction, wherein the first interface comprises preview cards of applications that are not closed;

receiving a second instruction for at least one of the preview cards; and displaying a second interface according to the second instruction, wherein the second interface comprises at least two display areas, and an application corresponding to a respective preview card that is displayed in at least one display area; and recording a plurality of historical application split-screen arrangement positions for a plurality of applications;

collecting statistics on the plurality of historical split-screen arrangement positions for the plurality of applications based on a habit of a user wherein the statistics include a frequency of the plurality of historical split-screen arrangement positions;

evaluating a historical application split-screen arrangement position based on the statistics; and determining a value P for an angle alpha, for the electronic device, that is used to determine whether the electronic device is in a folded state or an expanded state by:

obtaining a user specified value for the value P; or determining the value P for the angle alpha based on use habits by a plurality of other users, that is used to determine whether the electronic device is in a folded state or an expanded state;

in response to determining the value P, based on a change in the angle alpha, transition from a folded state to an expanded state, expanding a first preview card of the preview cards to a full screen view of the first screen and a second preview card of the preview cards to a full screen view of the second screen; and in response to determining the value P, based on a second change in the angle alpha, transition from an expanded state to a folded state, switching from the full screen views of the first and second preview cards to the split screen view of the first and second cards at the first screen.

18. The non-transitory computer storage medium of claim 17 further including training a machine learning module to select a historical split-screen arrangement position based on the pair of instructions.

19. An electronic device with a foldable screen having a first screen and a second screen comprises:
a foldable display screen, a memory, and
a processor configured to execute a computer program stored in the memory to generate a graphical user interface on the electronic device, wherein the graphical user interface is displayed when the electronic device performs the method comprising:
receiving a first instruction;
displaying a first interface in response to the first instruction, wherein the first interface comprises preview cards of applications that are not closed;
receiving a second instruction for at least one of the preview cards; and
displaying a second interface according to the second instruction, wherein the second interface comprises at least two display areas, and an application corresponding to a respective preview card that is displayed in at least one display area;
recording a plurality of historical application split-screen arrangement positions for a plurality of applications;
collecting statistics on the plurality of historical split-screen arrangement positions for the plurality of applications based on a habit of a user wherein the statistics include a frequency of the plurality of historical split-screen arrangement positions;
determining a value P for an angle alpha, for the electronic device, that is used to determine whether the electronic device is in a folded state or an expanded state by:
determining the value P for the angle alpha either by obtaining a user specified value for the value P or by determining the value P based on use habits by the user or a plurality of other users, to determine whether the electronic device is in a folded state or an expanded state;
in response to determining the value P, based on a change in the angle alpha, transition from a folded state to an expanded state, expanding a first preview card of the preview cards to a full screen view of the first screen and a second preview card of the preview cards to a full screen view of the second screen; and
in response to determining the value P, based on a second change in the angle alpha, transition from an expanded state to a folded state, switching from the full screen views of the first and second preview cards to the split screen view of the first and second cards at the first screen.

20. The electronic device of claim 19 further including further including training a machine learning module to select a historical split-screen arrangement position based on the pair of instructions.

* * * * *